United States Patent
Wong et al.

(10) Patent No.: US 7,452,585 B1
(45) Date of Patent: Nov. 18, 2008

(54) MONOLITHIC STRUCTURES, METHODS OF MANUFACTURE AND COMPOSITE STRUCTURES

(75) Inventors: Raymond S. Wong, San Ramon, CA (US); Stanley L. Lehmann, Martinez, CA (US); Wei Helen Li, San Ramon, CA (US)

(73) Assignee: Henkel Corporation, Rocky Hill, CT (US)

( * ) Notice: Subject to any disclaimer, the term of this patent is extended or adjusted under 35 U.S.C. 154(b) by 777 days.

(21) Appl. No.: 10/652,687

(22) Filed: Sep. 2, 2003

Related U.S. Application Data

(63) Continuation-in-part of application No. 09/621,549, filed on Jul. 21, 2000, now Pat. No. 6,630,221.

(51) Int. Cl.
*B32B 3/12* (2006.01)

(52) U.S. Cl. .................. 428/117; 428/116; 428/304.4; 428/313.3; 428/313.5; 428/314.2; 428/314.4; 428/315.5; 428/316.6; 428/317.9; 428/364; 428/367; 428/369; 428/402; 264/45.3; 264/51; 264/54; 264/320; 264/321; 264/176.1

(58) Field of Classification Search ............... 428/35.8, 428/35.9, 116, 117, 118, 304.4, 402, 313.3, 428/313.5, 314.2, 314.4, 315.5, 316.6, 317.9, 428/364, 367, 369; 528/94; 264/45.3, 51, 264/54, 320, 321, 176.1
See application file for complete search history.

(56) References Cited

U.S. PATENT DOCUMENTS 3,697,630 A * 10/1972 Yoshino 4,299,872 A * 11/1981 Miguel et al.

(Continued)

FOREIGN PATENT DOCUMENTS

EP 0 518 060 A2 5/1992

(Continued)

OTHER PUBLICATIONS

S. Rimdusit and H. Ishida, "Development of New Class of Electronic Packaging Materials Based on Ternary System of Benzoxazine, Epoxy, and Phenolic Resin," Polymer, 41, 7941-49 (2000).

(Continued)

*Primary Examiner*—Timothy M. Speer
*Assistant Examiner*—Gordon R Baldwin
(74) *Attorney, Agent, or Firm*—Steven C. Bauman

(57) ABSTRACT

An article of manufacture comprising a sag-resistant nucleus-forming monolithic composite capable of being located within a hollow interior portion of a structural material and being expanded therein. Also, articles of manufacture comprising open-cellular structural material containing within the open-cell or cell thereof, at least one sag-resistant nucleus-forming monolithic composite. The composite is desirably in the shape of a plug that is similar or close to similar to the shape of the hollow interior. In addition, there is described a process that comprises forming a pre-shaped sag-resistant nucleus-forming monolithic composite for use in reinforcing and stiffening a normally open-cellular structural material. Also described is a process for reinforcing or stiffening a normally open-cellular structure, any tubular structure, or any channel structure, by putting at least one sag-resistant nucleus-forming monolithic composite within a hollow interior portion of the structure. The invention is particularly desirable for stiffening and/or reinforcing honeycomb structures.

25 Claims, 7 Drawing Sheets

U.S. PATENT DOCUMENTS

| | | | | |
|---|---|---|---|---|
| 4,607,091 | A | | 8/1986 | Schreiber .................... 528/96 |
| 4,806,267 | A | | 2/1989 | Culbertson et al. ..... 252/182.23 |
| 4,913,404 | A | | 4/1990 | Warman ...................... 266/45 |
| 5,021,484 | A | | 6/1991 | Schreiber et al. ............ 524/100 |
| 5,200,452 | A | | 4/1993 | Schreiber .................... 524/398 |
| 5,443,911 | A | | 8/1995 | Schreiber et al. ............ 428/413 |
| 5,543,516 | A | | 8/1996 | Ishida ........................ 544/69 |
| 5,545,458 | A | * | 8/1996 | Fukushima et al. |
| 5,783,272 | A | * | 7/1998 | Wong ........................ 428/35.7 |
| 5,876,831 | A | * | 3/1999 | Rawal |
| 6,207,786 | B1 | * | 3/2001 | Ishida et al. .................. 528/94 |

FOREIGN PATENT DOCUMENTS

EP              0 323 142 B1      9/1993

OTHER PUBLICATIONS

H. Ishida and D. Allen, "Mechanical Characterization of Copolymers based on Benzoxazine and Epoxy", Polymer, vol. 37, No. 20, pp. 4487-4495 (1996).

H. Ishida and Y. Rodriguez, "Curing Kinetics of a New Benzoxazine-Based Phenolic Resin by Differential Scanning Calorimetry", Polymer, vol. 36, No. 16, pp. 3151-3158 (1995).

H. Kim and H. Ishida, "A Study on Hydrogen-Bonded Network Structure of Polybenzoxazines" J. Phys. Chem. A 106, pp. 3271-3280 (2002).

X. Liu and Y. Gu, "Study on the Volumetric Expansion of Benzoxazine Curing with Different Catalysts", J. Appl. Sci., vol. 84, pp. 1107-1113 (2001).

S. Rimdusit and H. Ishida, "Gelation Study of High Processability and High Reliability Ternary Systems based on Benzoxazine, Epoxy, and Phenolic Resins for an Application as Electronic Packaging Materials", Rheol Acta 41, pp. 1-9 (2002).

H. Kim, H. Ishida, "Study on the Chemical Stability of Benzoxazine-Based Phenolic Resins in Carboxylic Acids", J. Appl. Polym. Sci., vol. 79, pp. 1207-1219 (2001).

H. Ishida, D. J. Allen, "Gelation Behavior of Near-Zero Shrinkage Polybenzoxazines", J. Appl. Polym. Sci., vol. 79, 406-417 (2001).

H. Ishida, D.P. Sanders, "Improved Thermal and Mechanical Properties of Polybenzoxazines Based on Alkyl-Substituted Aromatic Amines", J. Polym. Sci.: Part B, vol. 38, pp. 3289-3301 (2000).

H. Ishida, D.P. Sanders, "Regioselectivity and Network Structure of Difunctional Alkyl-Substituted Aromatic Amine-Based Polybenzoxazines", Macromolecules, 33, 8149-8157 (2000).

S. B. Shen and H. Ishida, "Dynamic Mechanical and Thermal Characterization of High-Performance Polybenzoxazines", J. Polym. Sci.: Part B Polym. Phy., vol. 37, 3257-3268 (1999).

S. Rimdusit and H. Ishida, "Synergism and Multiple Mechanical Relaxations Observed in Ternary Systems Based on Benzoxazine, Epoxy, and Phenlic Resins", J. Polym. Sci: Part B: Polym. Phy., vol. 38, 1687-1698 (2000).

J. Dunkers, H. Ishida, "Reaction of Benzoxazine-based Phenolic Resins with Strong and Weak carbonxylic Acids and Phenols as Catalysts", J. Polym. Sci.: Part A: Polym. Chem., vol. 37, 1913-1921 (1999).

X. Zhang, A. C. Potter and D. H. Solomon, "The Chemistry of Novolac Resins—V. Reaction of Benzoxazine Intermediates", Polymer, vol. 39, 399-404 (1998).

X. Zhang and D. H. Solomon, "The Chemistry of Novolac Resins—VI. Reactions Between Benzoxazine Intermediates and Model Phenols", Polymer, vol. 39, No. 2, pp. 405-412 (1998).

Y. Wang and H. Ishida, "Development of Low-Viscosity Benzoxazine Resins and Their Polymers", J. Appl. Polym. Sci., vol. 86, pp. 2953-2966 (2002).

K. Hemvichian and H. Ishida, Thermal Decomposition Processes in Aromatic Amine-Based Polybenzoxazines Investigated by TGA and GC-MS, Polymer, vol. 43, pp. 4391-4402 (2002).

B.M. Culbertson, "Cyclic Imino Ethers in Step-Growth Polymerizations", Prog. Polym. Sci., Article in Press (2001).

P. Chutayothin, H. Ishida, and S. Rowan, "Cationic Ring-Opening Polymerization of Monofunctional Benzoxazine", Polymer Reprints, 42(2), pp. 599-600,621-622 (2001).

P. Chutayothin, H. Ishida, and S. Rowan, "Cationic Ring-Opening Polymerization of Monofunctional Benzoxazine", Polymer Reprints, 42(2), pp. 599-600, 621-622 (2001).

T. Agag and T. Takeichi, "Novel Benzoxazine Monomers Containing p-Phenyl Propargyl Ether: Polymerization of Monomers and Properties of Polybenzoxazines", Macromolecules, 34, pp. 7257-7263 (2001).

H. Kimura, et al., "New Thermosetting Resin from Poly(p-vinylphenol) Based Benzoxazine and Epoly Resin", J. Appl. Polym. Sci, vol. 79, 555-565 (2001).

A. S. C. Lim, et al., "Chemistry of Novolac Resins. X. Polymerization Studies of HMTA and Strategically Synthesized Model Compounds", J. of Polym. Sci.: Part A: Polym. Chem., vol. 37, 1347-1355 (1999).

H.Y. Low and H. Ishida, "Mechanistic Study on the Thermal Decomposition of Polybenzoxazines: Effects of Aliphatic Amines", J. of Polym. Sci.: Part B: Polym. Phy., vol. 36, pp. 1935-1946 (1998).

H. Kimura, et al., "Epoxy Resin Cured by Bisphenol A. Based Benzoxazine", J. of Appl. Polym. Sci., vol. 68, 1903-1910 (1998).

J. E. McGrath, et al., "Syntheses and Characteristic of Segmented Polyimide-Polyorganosiloxane Copolymers", Adv. in Polym. Sci., vol. 140, pp. 61-105 (1999).

ULTEM 2000 (CAS Reg. No. 61128-46-9) (2003).

W. J. Burke, et al., "A New Aminoalkylation Reation. Condensation of Phenols with Dihydro-1, 3-Aroxazines", J. Org. Chem., vol. 30(10), pp. 3423-3427 (1965).

J. Jang and D. Seo, "Performance Improvement of Rubber-Modified Polybenzoxazine", J. Appl. Polym. Sci., vol. 67, pp. 1-10 (1998).

Hajime Kimura, et al., "New Thermosetting Resin from Bisphenol A-Based Benzoxazine and Bisoxazoline", J. Appl. Polym. Sci., vol. 72, pp. 1551-1558 (1999).

Raymond A. Pearson, "Toughening Epoxies Using Rigid Thermoplastic Particles", American Chemical Society, pp. 405-425 (1993).

* cited by examiner

MONOLITHIC STRUCTURES, METHODS OF MANUFACTURE AND COMPOSITE STRUCTURES

RELATED U.S. APPLICATION DATA

This application continues-in-part from U.S. patent application Ser. No. 09/621,549, filed Jul. 21, 2000 now U.S. Pat. No. 6,630,221.

BACKGROUND OF THE INVENTION

1. Field of the Invention

Monoliths of essentially uniform density containing thermoplastic particles essentially uniformly dispersed in a matrix resin system, are described. Composites of the monolith and core-holding structures are made by incorporating the monolith into the core-holding structure, optionally thermally treating the matrix resin of the monolith whereby the thermoplastic particles (if in situ-expandable) causes the thermally treated monoliths to faultlessly interface with the wall(s) of the core-holding structures. The invention relates to core supported composite structures, fasteners, adhesives, paneling, insulation, and other structures that employ the invention as a component.

2. Brief Description of Related Technology

Sandwich construction forms a major part of aerospace manufacturing; it is employed to some degree in almost every type of flight vehicle. Lightweight structural panels and panel systems for a wide variety of applications are industrially offered. They utilizing various laminating techniques to adhere thin, stiff "skins", such as aluminum, steel, hardboard and fiberglass onto lightweight core materials, like honeycombs, urethane foams and balsa. The resulting panel is lightweight and strong.

Honeycomb sandwiches, i.e., honeycombs, are preferred structures in the fabrication of lightweight structures typically used in the aerospace and other commercial markets. The core material is usually "sandwiched" between skins of aluminum or other high strength composite material. A bonding adhesive is used to attach the "skin" material to the honeycomb core. The resultant honeycomb panel offers one of the highest strength to weight constructions available. For instance, the floor panels of most airliners use the lightweight/high strength construction of honeycomb. Aircraft engine nacelles, flaps, overhead bins and galleys all are constructed from honeycomb core.

A honeycomb may be called a multicellular structure, and it may be made of paper, plastic, fabric or metal, and other materials. The core of the sandwich is the honeycomb, a structure composed of row upon row of framed cells, or holes or wells, resembling the honey-storage facility of a beehive and characterized by a hexagonal or rectangular shape. To each side of the core are bonded extremely thin sheets of metal, creating the sandwich, which is far lighter yet has greater resistance to bending than a comparable thickness of metal plate. Aluminum is the most extensively used metal, in both the core and the facing sheets, but the technique is applicable to a large number of metallic and nonmetallic materials.

For example, M.C. Gill Corporation offers the following honeycomb products to Boeing's specifications:

| Specification Number | Q[1] | M[2] | Product Code Number and Description |
|---|---|---|---|
| BMS 4-7C | | X | Gillfab 4030 - Aluminum facings/aluminum honeycomb core sandwich panel. |
| BMS 4-10 Ty 1, Gr 1 | | X | Gillfab 5040Z and 5042 - Aluminum facings/end grain balsa wood core sandwich panel. |
| BMS 4-10 Ty 2 | | X | Gillfloor ® 5007A and 5007B - Fiberglass cloth facings/end grain balsa wood core sandwich panel for aircraft flooring. |
| BMS 4-17 | | X | Gillfloor 4417, Ty I thru Ty VI and Drawing 69B15779 (Ty V) - Unidirectional fiberglass reinforced epoxy facings/Nomex honeycomb core sandwich panel. |
| BMS 4-20 | | X | Gillfab 4409, Ty II and Ty III (Ty I is obsolete) -- Unidirectional graphite reinforced epoxy facings/Nomex honeycomb core sandwich panel. |
| BMS 4-23 | | X | Gillfab 5424, Ty I and Ty II - Unidirectional S-glass facings/aluminum honeycomb core sandwich panel. |
| BMS 7-326 | | X | Gillfloor 5433C - Aluminum facings/unidirectional fiberglass reinforced epoxy core sandwich panel. |
| BMS 8-2 Cl 1 Gr A | | X | Gillfab 1076A - Fire resistant polyester glass cloth cargo liner. |
| BMS 8-2 Cl 2 Gr A | | X | Gilliner ® 1366 - Extremely high impact, puncture, and fire resistant polyester glass cloth cargo liner. |
| BMS 8-2 Cl 2 Gr B | | X | Gilliner 1366T - Same as 1366 but with a 1 mil white Tedlar ® overlay. |
| BMS 8-2 Cl 3 | | X | Gillfab 1076B - Fire resistant polyester glass cloth cargo liner. |
| BMS 8-100 Gr A and B, Cl 1 | | X | Gillfab 1108 - Epoxy/unidirectional fiberglass cargo liner. |
| BMS 8-13 Ty 1 | | X | Gillfab 1137 - Nylon resin/nylon cloth fuel cell liner. |
| BMS 8-223 Cl 2 | | X | Gillfab 1367 - Phenolic/S-2 glass cloth cargo liner with low smoke emission. |
| BMS 8-223 Cl 2 | | X | Gillfab 1367A - Phenolic/fiberglass cargo liner with low smoke emission. |
| BMS 8-223 Cl 2 | | X | Gillfab 7146 - Phenolic/S-2 glass cargo liner replacement kits. |
| BMS 8-223 Cl 4 | | X | Gillfab 1367B - Phenolic/fiberglass cargo liner with low smoke emission. |
| BMS 8-124 | | X | Gillcore ® HD - Nomex honeycomb. |
| BMS 8-262 Cl 1, Gr B | | X | Gilliner 1566 - KEVLAR ®/polyester cargo liner - very light weight. |

[1]Q = Qualified to specification
[2]M = Meets the requirements of specification To illustrate some of the physical characteristics of commercial honeycombs, such as Plascore Inc., Zeeland, Mich., PAMG-XR1 5052 Aluminum Honeycomb literature provides:

Typical Property Values
PAMG-XR1 5052 Aluminum Honeycomb

| Honeycomb Designation | | | Bare Compression | | Plate Shear | | | |
|---|---|---|---|---|---|---|---|---|
| | | | | | Strength (PSI) | Strength (PSI) | Modulus (KSI) | Modulus (KSI) |
| Cell Size | Foil Gauge | Density (PCF) | Strength (PSI) | Modulus (KSI) | "L" Direction | "W" Direction | "L" Direction | "W" Direction |
| 1/8 | .0007 | 3.1 | 270 | 75 | 210 | 130 | 45 | 22 |
| 1/8 | .001 | 4.5 | 520 | 150 | 340 | 220 | 70 | 31 |
| 1/8 | .0015 | 6.1 | 870 | 240 | 505 | 320 | 98 | 41 |
| 1/8 | .002 | 8.1 | 1400 | 350 | 725 | 455 | 135 | 54 |
| 5/32 | .0007 | 2.6 | | | | | | |
| 5/32 | .001 | 3.8 | | | | | | |
| 5/32 | .0015 | 5.3 | | | | | | |
| 5/32 | .002 | 6.9 | | | | | | |
| 5/32 | .0025 | 8.4 | | | | | | |
| 3/16 | .0007 | 2.0 | | | | | | |
| 3/16 | .001 | 3.1 | 270 | 75 | 210 | 130 | 45 | 22 |
| 3/16 | .0015 | 4.4 | 500 | 145 | 330 | 215 | 68 | 30 |
| 3/16 | .002 | 5.7 | 770 | 220 | 460 | 300 | 90 | 38 |
| 3/16 | .0025 | 6.9 | 1080 | 285 | 590 | 375 | 114 | 46 |
| 3/16 | .003 | 8.1 | 1400 | 350 | 725 | 455 | 135 | 54 |
| 1/4 | .0007 | 1.6 | 85 | 20 | 85 | 50 | 21 | 11 |
| 1/4 | .001 | 2.3 | 165 | 45 | 140 | 85 | 32 | 16 |
| 1/4 | .0015 | 3.4 | 320 | 90 | 235 | 150 | 50 | 24 |
| 1/4 | .002 | 4.3 | 480 | 140 | 320 | 210 | 66 | 29 |
| 1/4 | .0025 | 5.2 | 670 | 190 | 410 | 265 | 82 | 35 |
| 1/4 | .003 | 6.0 | 850 | 235 | 495 | 315 | 96 | 40 |
| 1/4 | .004 | 7.9 | 1360 | 340 | 700 | 440 | 130 | 52 |
| 3/8 | .0007 | 1.0 | 30 | 10 | 45 | 30 | 12 | 7 |
| 3/8 | .001 | 1.6 | | | | | | |
| 3/8 | .0015 | 2.3 | 165 | 45 | 140 | 85 | 32 | 16 |
| 3/8 | .002 | 3.0 | 260 | 70 | 200 | 125 | 43 | 21 |
| 3/8 | .003 | 4.2 | 460 | 135 | 310 | 200 | 65 | 29 |

Other Plascore honeycomb products include:

PAMG-XR1 5056 aluminum honeycomb is a lightweight core material which offers superior strength and corrosion resistance over PAMG-XR1 5052 and PCGA Commercial grade aluminum core. PAMG-XR1 5056 core is made from 5056 aluminum alloy foil and meets all the requirements of MIL-C-7438.

PCGA-XR1 honeycomb is a lightweight core material offering excellent strength and corrosion resistance for industrial applications at low cost. PCGA-XR1 core is made from 3003 aluminum alloy foil.

PN ARAMID Honeycomb is a lightweight, high strength, non-metallic honeycomb manufactured with ARAMID fiber paper (DuPont NOMEX™ or equivalent). The ARAMID paper is treated with a heat resistant phenolic resin. This core material exhibits excellent resiliency, small cell size, low density and outstanding flame properties.

Plascore polycarbonate honeycomb core exhibits a unique cell structure: The core has 3 orientations vs. the 2 orientations common with other cores, making its properties more uniform. Each cell has a tubular form and inherently stable.

Plascore polypropylene honeycomb core exhibits a unique cell structure: The core has 3 orientations vs. the 2 orientations common with other cores, making its properties more uniform. Each cell has a tubular form and inherently stable.

Plascore polypropylene honeycomb is supplied with or without a non-woven polyester veil for better bonding. It is also supplied with or without a film barrier under the polyester veil to limit the amount of resin consumption.

Euro-Composites offer for sale honeycombs with cell sizes ranging from 3.2 to 19.2 mm and a density of between 24 and 200 kg/m$^3$, in hexagonal and rectangular-celled cores.

Aerospace manufacturers started the use of honeycomb products in airplanes and spacecraft because, pound-for-pound, it's the strongest, most rigid product known. Some of its special uses were the heat shield on John Glenn's space capsule, interior structures for America's first Skylab, and shock-resisting hulls of hydroplanes.

There are many ways to fasten one structure to another. Fasteners are objects that attach one item to another, and create methods by which those attachments are effected. In industrial applications, fastening may be accomplished through needle stitching, anchoring, connecting, locking, welding, riveting, nailing, screwing, adhesive bonding, chemical reaction bonding, magnetic bonding, and the like.

The concept of fastening started with the earliest concepts of interweaving of dissimilar materials, clamps, nailing, screwing and the like. Eventually, man learned to bond with metals, and this led to riveting, bolting and welding. Each of these techniques led to advances in the art of fastening.

An adhesive is a substance used to bond two or more surfaces together. Most adhesives have the advantage of forming a bond by filling in the minute pits and fissures normally present even in very smooth surfaces. Adhesive bonds are economical, distribute the stress at the bonding point, resist moisture and corrosion, and eliminate the need for rivets and bolts. The effectiveness of an adhesive depends on several factors, including resistance to slippage and shrinkage, malleability, cohesive strength, and surface tension, which determines how far the adhesive penetrates the tiny depressions in the bonding surfaces. Adhesives vary with the purpose for which they are intended. Such purposes now include the increasing use of adhesives in aerospace applications. Synthetic adhesives used both alone or as modifiers of natural adhesives, perform better and have a greater range of application than the natural products. Most of them form polymers, huge molecules incorporating large numbers of simple molecules to form strong chains and nets that link surfaces in a firm bond. Thermosetting adhesives, which are transformed into tough, heat-resistant solids by the addition of a catalyst or the application of heat, are used in such structural functions as bonding metallic parts of aircraft and space vehicles. Thermoplastic resins, which can be softened by heating, are used for bonding wood, glass, rubber, metal, and paper products. Elastomeric adhesives, such as synthetic or natural rubber cements, are used for bonding flexible materials to rigid materials.

Many aerospace structures are adhesively bonded through the use of thin adhesive films, typically made from a filled thermosetting resin such as an epoxy resin. These films are easier to apply and cleaner to use, and therefore find wide acceptance in applications where neat utilization of the adhesive is a plus factor.

SYNCORE® syntactic foams offered for sale by Henkel Loctite Corporation, d/b/a Loctite Aerospace, Bay Point, Calif., take the place of more expensive prepreg plies in stiffening critical structures. These isotropic foams are composite materials containing preformed microballoons in a thermosetting matrix resin. A wide variety of preformed microballoons and matrices can be combined to make SYNCORE® syntactic foams. Glass is the most common microballoon material of construction, but quartz, phenolic, carbon, thermoplastic and metal-coated preformed microballoons have been used. Epoxies curing at 350° F. (177° C.) and 250° F. (121° C.) are the most common thermosetting matrix resins, but matrices of bismaleimide ("BMI"), phenolic, polyester, PMR-15 polyimide and acetylene or acrylic or vinyl-terminated resins have been used to produce SYNCORE® syntactic foams. As a result of the variety of materials that successfully make SYNCORE® syntactic foams, they are tailorable to a variety of applications. There is a version of SYNCORE® syntactic foams available that will co-cure with all known available heat-cured composite-laminating resins. SYNCORE® syntactic foams allows sandwich core concepts to be used in a thinner dimension than previously possible. The thickness limit on honeycomb cores is approximately 0.125 inch. SYNCORE® syntactic foams are available in 0.007 to 0.125 inch (0.18 mm to 3.2 mm) thickness but can be made in thinner or thicker sheet forms. Other core materials such as wood and sheet foam can be made thin, but are not drapable and generally require an expensive/heavy adhesive film to bond to the partner composite components. In addition, SYNCORE® syntactic foams possess excellent uniformity in thickness which provides the ability to assure quality for the composite in which it is used as a component. SYNCORE® syntactic foams are typically used to replace prepreg plies where the intent is to increase stiffness by increasing thickness.

Designing with SYNCORE® syntactic foams is straightforward because all of the analysis methods that apply to other core materials such as honeycomb apply to it. Flexural stiffness of flat plates and beams increases as a cubic function of thickness allowing a lighter, stiffer lamination than could be made from prepreg plies alone. Since SYNCORE® syntactic foams, on a per volume basis, typically costs less than half of a comparable carbon prepreg, it also leads to a lower cost lamination. This is illustrated by the following:

- Adding one ply of 0.020 inch SYNCORE® syntactic foams and eliminating one ply of prepreg does not change the weight or cost significantly, but nearly doubles the flexural rigidity.
- Adding one ply of 0.020 inch SYNCORE® syntactic foams and eliminating three plies of prepreg sharply decreases the cost and weight with a small decrease in rigidity.
- Adding one ply of 0.040 inch SYNCORE® syntactic foams and eliminating three plies of prepreg provides lower weight, cost and sharply increases rigidity.
- The introduction of unidirectional tape allows a further increase in performance at lower cost and weight at nearly the same thickness.
- A hybrid tape/fabric/SYNCORE® syntactic foams construction gives a very attractive set of weight and cost savings coupled with a 3.4 times increase in flexural rigidity.

SYNCORE® syntactic foams have been recommended for thin composite structures in any application where flexural stiffness, buckling, or minimum gauge construction is used. SYNCORE® syntactic foams have been shown to save weight and material cost in carbon fiber composites, and in the case of glass fiber composites to save weight at approximately the same cost. Illustrative applications are disclosed in U.S. Pat. Nos. 4,861,649, 4,968,545, and 4,994,316.

Assembly methods with SYNCORE® syntactic foams is similar to those used with prepregs. Because it is not cured, SYNCORE® syntactic foams are tacky and drapable when warmed to room temperature and is easier to lay-up than a comparable prepreg ply. SYNCORE® syntactic foams can be supplied in supported forms with a lightweight scrim to prevent handling damage when it is frozen. Like prepregs, SYNCORE® syntactic foams require cold storage, usually at 0° F. (−17.7° C.) or below. The various SYNCORE® syntactic foams typically have a room temperature out-time that is much longer than their companion prepregs. SYNCORE® syntactic foams are less sensitive to cure cycle variations than prepreg making the controlling factor the composite cure cycle selection. SYNCORE® syntactic foams will cure void free under full vacuum or low (e.g., about 10 psi) autoclave pressure. SYNCORE® syntactic foams have been cured at up to about 150 psi, without exhibiting balloon crushing.

In a typical application, a sandwich of SYNCORE® syntactic foam and prepreg, such as a thicker layer of SYNCORE® syntactic foam between two thinner layers of prepreg, are held together under heat and pressure to cure the structure into a strong panel. Typical sandwich constructions of this nature are shown in U.S. Pat. Nos. 4,013,810, 4,433, 068 and 3,996,654. Such composite structures typically are produced in flat sheets and in separable molds to obtain various desired shapes.

Though SYNCORE® syntactic foams will cure void free under significantly reduced pressure or when put under pressure, it would be desirable to avoid those costly conditions to achieve void reduction. It would be desirable to have a material that has the properties of SYNCORE® syntactic foams but achieves void free construction without costly full vacuum operations or low autoclave pressure systems. These methods are typically batch type operations that materially add to the cost of making the composite.

There are certain applications in which it is desirable to have the properties of a uniform thin drapable syntactic foam film in processing the formation of a laminated composite, yet have the capacity to autogenously expand so as to fill any void space existing in the composite's structure so as to minimize the effects of macro and micro void defects at interlaminate interfaces.

These interlaminar interfacial micro or macro void spaces are magnified by the irregularity of the reinforcing layer of the composite structure. For example, if the composite is of a layer of prepreg-derived carbon fiber reinforced thermosetting resin material, bonded to a syntactic foam, such as a SYNCORE® syntactic foam, the layer containing the prepreg-derived material will have an irregularly shaped surface and the SYNCORE® syntactic foam layer will have a relatively smooth uniform surface. Though the SYNCORE® syntactic foam is tacky and drapable, it is incapable of filling in all of the irregularities of the prepreg-derived layer. Application of a full vacuum or the use of a low-pressure autoclave can be used to significantly reduce the void space, but complete avoidance of micro voids is not readily achievable. Also, conforming SYNCORE® syntactic foams to the irregular surface causes transfer of the irregularity to the opposite surface of the SYNCORE® syntactic foam. Such surface irregularity transfer may be avoided by sandwiching the SYNCORE® syntactic foam using heat and pressure. This re-positions the matrix resin and the microspheres so that the film within the sandwiched structure loses its original uniformity.

It would be desirable to be able to adequately bond a syntactic foam thin film to an irregular surface[1] and fill the defects in the surface without transferring the shape of the defects to the unbonded side of the film. It would also be desirable to be able to adequately bond a syntactic foam thin film to a surface and, without the use of vacuum or low-pressure autoclaves, fill the micro voids with the syntactic foam without repositioning the film's matrix resin and microspheres. Such advantages are achieved by the use of SYNSPAND® expandable films, described below.

[1] Such a surface is one that may contain undulations, cracks, large pores, warpage, and the like defects.

There is a body of technology directed to fabricating expandable thermoplastic resinous material. For example, U.S. Pat. No. 2,958,905, is directed to a method of making foam structures from particulate expandable granular thermoplastic resinous material containing in the particles a blowing agent for further expansion of the particles. A considerable number of thermoplastic resins are described as suitable for this purpose. The blowing agents are the conventional ones recommended for that application. The expandable granular thermoplastic resinous material may be admixed with a thermosetting resin to generate on curing the exotherm needed to expand the expandable granular thermoplastic resinous material. The resulting mass can be poured into a mold to make a number of products. The '905 patent indicates that the expandable granular thermoplastic resinous material can be formed in the presence of non-expandable filler materials such as staple fibers from a variety of sources, and the mixture fed to a mold for forming an expanded product. The resulting foamed product may be designed to adhesively bond to a fabric layer for reinforcement of the foamed product. The density of the foamed product can be controlled by the amount of the expandable material fed to the mold. At column 12, lines 5 et seq., the '905 patent speaks to the formation of molded products by charging the mold "with the expandable material in any desired manner including manual filling or pneumatic conveyance thereof." According to the description at column 12 relating to FIGS. 3 and 4 (see column 12, lines 16-32):

. . . a considerable occurrence of void and hollow spaces occurs between the charged expandable beads 21 in the mass to be fabricated, each of which (in the case of pre-expanded material) is a foam structure containing a plurality of internal cells or open spaces. When the liquid exothermus [sic] substance is added between such interparticle voids, the heat from its spontaneous self reaction causes the beads to expand whereby, as illustrated in FIG. 4, the expanded and fabricated particles 22 force out a substantial portion (and frequently most) of the exothermus [sic] substance excepting for a minor quantity of reacted material 23 which remains, frequently as an interlaced and interlinking network between the expanded particles to assist in holding the expanded, cellular foam particles together. (Emphasis added.)

U.S. Pat. No. 2,959,508, describes another variation of using expandable thermoplastic particles. Here, the unexpanded particles and the exothermus substance, such as an epoxy resin, are first mixed and then poured into the mold to form a composite foam of the two when the exothermus substance heats up the mixture and causes the blowing agent to volatilize.

Thermosetting resins have in the past had blowing agents incorporated therein (see e.g. U.S. Pat. No. 3,322,700) to form expanded molded products and recently, such types of resin systems have included preformed microspheres in the formation of partial syntactic foam films. These expanded thermosets comprise a more open cellular structure unlike that of syntactic foams, and the inclusion of preformed microspheres does not alter that condition.

There are commercial molding processes that utilize tacky sheets of thermosetting resins and reinforcing material. One such process involves the compression molding of sheet molding compounds ("SMC"). In that process, a thermosetting polyester resin filled with staple glass fiber and low profile thermoplastics, are sheeted out and thickened into a pourable paste retained between release surfaces such as polyethylene film. Chunks of the thickened paste are casually deposited around the surface of the mold by hand, and on closing the mold with heating, the paste is liquefied and it, and its fiber loading, are redistributed around the mold to fill it up and form the desired molded article. In other words, the chunks of sheets of SMC represent a convenient way in which to add a liquefiable moldable material to the mold. This process is presently commercially practiced in a number of industries. Advantages of the process are the convenience of storing moldable mixture and the ease of loading a mold with the molding composition.

An advantage of SYNCORE® syntactic foams for many applications resides in its uniformity of distribution of the microsphere throughout the matrix resin. Such microspheres remain essentially intact throughout the cure cycle. As a result, it is not possible to have the microspheres concentrate at one or more surfaces, or one or more other locations in the final composite. It would be desirable to have a drapable thin film, having the handling qualities of SYNCORE® syntactic foams, but which would allow the production of a syntactic foam having a controllable density gradient that accommodates specific end use applications.

There are a number of applications in which thin film syntactic foam could serve as a seal to preclude the passage of gases and liquids. In some applications, the seal could be subjected to abrasion forces. It would be desirable to have a thin film syntactic foam that can be applied in a manner that allows it to be a sealant to gas or liquid flow in a confined space and be able to withstand abrasive forces. Such advantages are derived from the use of SYNSPAND® expandable films, described below.

U.S. Pat. Nos. 5,234,757, 5,397,611, 5,540,963, and 5,783,272 describe a thin film technology that can be used in forming syntactic foam. Such a thin film is commercially available as SYNSPAND® expandable films from Henkel Loctite Corporation, d/b/a Loctite Aerospace, Bay Point, Calif. SYNSPAND® expandable films combine expansion with syntactic technology to produce an efficient core filler and reinforcement material. SYNSPAND® expandable films comprise a thin, tacky film of incompatible in situ-expandable thermoplastic particles in a thermosettable matrix resin that contains an essentially uniform density and thickness across the breadth of the film. In its optimum form SYNSPAND® expandable films provide closed cell expansion, see U.S. Pat. No. 5,783,272. SYNSPAND® expandable films can be laid up in a honeycomb core and each film that is laid up is homogeneously expanded therein to reinforce and stiffen the honeycomb structure at that portion of the structure, without unduly adding weight to the structure. SYNSPAND® expandable films are sold in 1 foot by 2-feet sheets and rolls stock (18 inches by 25 lineal feet) in thicknesses of 50 and 100 mils. SYNSPAND® expandable films may contain preformed microspheres as well, such as those that are used in making SYNCORE® syntactic foams.

SYNSPAND® expandable films are an excellent product and has gained wide commercial acceptance. However, as the utilizations of such forms of syntactic foams are expanded, there are uses where the thin film qualities of SYNSPAND® expandable films do not conveniently meet the needs of the user. For example, in honeycomb applications, a sheet or sheets of SYNSPAND® expandable films are applied over a plurality of honeycomb open spaces in the core, and with heat and pressure, generally under vacuum, but preferably by use of positive pressure from a heated platen, the SYNSPAND® expandable film is forced into open spaces to which it is contiguous. This requires the SYNSPAND® expandable films to flow into the honeycomb structure and assume some dimensional structural similarity to that of the open space of the honeycomb into which it flows. This technique insures that the SYNSPAND® expandable films is in contact with the honeycomb surface over which it is originally laid, either the top or bottom surface of the honeycomb structure, and the walls of the open cells of the honeycomb structure. It is inevitable that some amount of the SYNSPAND® expandable films is left behind on that surface. Further heating cause the matrix resin to flow and sag into the core of the honeycomb structure, and the in situ expandable particles to expand, preferably before gelation of the matrix resin, primarily in the "z" direction (see the discussion in the bridging paragraph at columns 9 and 10 of U.S. Pat. No. 5,397,611), and allows for curing the expanded SYNSPAND® expandable films in the honeycomb. This serves to reinforce and stiffen the honeycomb structure without unduly adding weight to the structure. However, the small amounts of SYNSPAND® expandable films left on the top or bottom surface of the honeycomb are going to be expanded as well. In addition, sagging of the resin causes it to contact the walls of the honeycomb core before expansion, thus expansion not only is in the "z" direction, but also starts from the wall to fill the center of the core; which is opposite to the type of expansion that one would desire. The small amount of SYNSPAND® expandable films left on the top or bottom surface can be ameliorated to some degree by applying an adhesive film over that surface into which the residual SYNSPAND® expandable films can be solubilized.

A deficiency in SYNSPAND® expandable film technology resides in the fact that the top of the film is the primary exposed surface area for expansion. Because the edges of the film possess relatively little of the films surface area, and the molding method of choice forces the edges into contact with the walls of the open cells of the honeycomb structure followed by sagging, expansion must of necessity occur essentially from and in the "z" direction and also from the core walls. This concentration of expansion to essentially a single surface fails to optimize the strength/density/rigidity relationship in such honeycomb structures and does not readily allow reinforcement within the open cells of the honeycomb structure by continuous filament fibers aligned normal to the surface of the honeycomb structure. Under the sagging scenario, expansion in the "z" direction causes the resin to intersect at some part of the open space being filled. Unless the resin contact is seamless by virtue of molten mixing of the different resin film, there is an opportunity for the resin to form an interface within the open space that possesses a lower structural integrity than the remainder of the expanded polymer structure. In addition, SYNSPAND® expandable film technology does not readily allow structural combinations with continuous filament structures in a way that maximizes rigidity and strength to syntactic foam structures incorporated into a traditional honeycomb structure.

SUMMARY OF THE INVENTION

This invention relates to solid adhesive structures, core fillers and reinforcement materials, and fasteners that rely on syntactic foam technology and are suitable for use in many different industries, such as aerospace, automotive, building construction, and the like. More specifically, this invention relates to reinforcement or stiffening of a normally open-cellular structural material (such as any honeycomb structures (such as those described above), any tubular structures, any channel structures, and the like). The invention is a sag-resistant nucleus-forming monolithic composite that can be located within a hollow interior portion of the aforementioned structural material. This invention forms a pre-shaped sag-resistant nucleus-forming monolithic composite that can be used more conveniently and function more effectively in reinforcing and stiffening a normally open-cellular structural material. The invention relates to structural material containing at least one of the sag-resistant nucleus-forming monolithic composites located within a hollow interior portion of the structural material. The invention relates as well to processing for making and using the pre-shaped sag-resistant nucleus-forming monolithic composite of the invention. The composite may be pre-expanded or expandable, depending on the type of application to which the composite is destined and the type of thermoplastic particle dispersed within the matrix of benzoxazine-containing composition.

The pre-shaped sag-resistant nucleus-forming monolithic composite comprises thermoplastic particles, essentially uniformly distributed in a matrix resin of benzoxazine-containing composition. In one aspect the thermoplastic particles are pre-expanded; in another aspect, they are expandable and contain an expansion agent therein so that the thermoplastic particles are in the thermo-expandable state. The matrix resin may be in a partially cured state, and if so not fully cured or at such a state of cure that it inhibits the desired degree of expansion of the composite. Preferably, the resin is devoid of a degree of crosslinking that exhibits viscosity increase in the composite. The composite contains an essentially uniform density and thickness across its breadth and it possesses an external shape and size that is dimensionally similar to a hollow interior component of the structural material.

"Pre-shaped" means that the monolithic composite does not undergo a shaping process when introduced into the hollow interior component of the structural material. It is already shaped for introduction into the hollow interior component. The term "dimensionally similar" means that when the nucleus-forming composite is placed in the hollow interior component of the structural material and is heated sufficiently to cause isotropic expansion of the incompatible in situ-expandable thermoplastic particles, the nucleus-forming composite uniformly expands to cause the formation of a syntactic foam, especially a closed cell syntactic foam, that has an essentially faultless interface with the wall(s) of the hollow interior component and possesses an essentially uniform density throughout. As used herein, the term "monolithic" means something that is essentially uniform and substantial or inflexible in quality or character. The term "thermo-expandable state" means the in situ-expandable thermoplastic particles heated to a condition where the expansion agent in the particles are expanding; this means that the thermoplastic resin in the particles are sufficiently softened that the particles expand in size. The term "sag-resistant" means to resist sinking or bending, by or as if by weight or pressure when the composite is placed in the hollow interior component of the structural material, sufficiently to avoid snagging of the composite on the hollow interior. The term "faultless" means that the flaws inherently present in the wall are filled and sealed by the expanded composite. The term "essentially uniform" means that the product has a prescribed uniformity according to a predetermined standard.

In another aspect, this invention relates to a sag-resistant nucleus-forming monolithic composite constructed from a benzoxazine-containing heat curable composition. Within the composite are thermoplastic microspheres, which may be either pre-expanded thermoplastic particles that form closed-microcells or incompatible in situ-expandable thermoplastic particles that form closed-microcells upon isotropic expansion, either of which being essentially uniformly distributed in the benzoxazine-containing heat curable composition.

The monolithic composite contains an essentially uniform density and thickness across its breadth. Also the monolithic composite possesses an external shape and size that is dimensionally similar to a hollow interior component of a structural material that is about 1.01 to about 4 times greater in volume than the volume of monolithic composite. In other words, the sag-resistant nucleus-forming monolithic composite of the invention has a shape and dimensions that, in a preferred embodiment, essentially correlates the shape and is at least close to proportional to the dimensions of the hollow interior component of a structural material into which it can be readily inserted. In some instances, where expandable thermoplastic particles are used, the composite may be isotropically expanded to form a syntactic foam with closed microcells. The conformance of the shape and dimension of the sag-resistant nucleus-forming monolithic composite of the invention to the hollow interior component of a structural material is significant to achieve the advantages of the preferred invention. The proportionality of the dimension of the sag-resistant nucleus-forming monolithic composite to the hollow interior component is such that the composite isotropically expands about 1.01 to about 4 times in volume to fully fill the previously hollow interior component. In the preferred embodiment, the end surface of the monolithic composite is appropriately shaped such that it can stand within the hollow interior component without touching any of the sidewalls of the hollow interior component.

Sag-resistance is an important feature of the sag-resistant nucleus-forming monolithic composite. Sag-resistance must exist at the time the monolithic composite is inserted in the hollow interior component of the structural material. Sag-resistance is commensurate with the dimension similarity of the monolithic composite to that of the hollow interior component. The closer the dimension similarity, the greater must be the sag-resistance. In other words, the monolithic composite must be capable of insertion into the hollow interior without snagging of the composite on any surface of the hollow interior during insertion. Preferably, the monolithic composite should have enough sag resistance that the composite does not sag once it is placed in the hollow interior component of the structural material.

The term "isotropic expansion" as used herein means the expansion along all axes or directions up until a surface portion(s) of the monolithic composite during expansion makes contact with and forms an essentially faultless interface with the wall(s) of the hollow interior component. For example, the hollow interior component may have an irregular surface such that a portion of the outer surface of the monolithic composite may be dimensionally closer to a juxtaposed portion of the irregular surface. During expansion such closer outer surface may make faultless interface with the closer wall portions before other portions of the outer surfaces make faultless interface with other juxtaposed wall portions of the hollow interior component. In many instances, the monolithic composite may be placed in contact with a segment of the wall surface of the hollow interior component before expansion is initiated. In those instances, "isotropic expansion" continues but the axis or directions may be reoriented such that multiple isotropic expansions occur within the expanding monolithic composite. The overall effect of such expansion is that the expanded monolithic composite possesses an essentially uniform density throughout.

The uniform density of the syntactic foam of the invention derived from isotropic expansion of the monolithic composite means that the density in any direction is essentially uniform, that is, the density does not differ by more than about ±5 percent in weight in any direction. However, density differences can be intentionally built into the resulting syntactic foam. For example, one may include reinforcing fibers or fillers that are located at preferred segments of the resulting syntactic foam so that the resulting syntactic foam composite has increased reinforcement at those segments.

An important alternative embodiment of the invention is a fiber reinforced sag-resistant nucleus-forming monolithic composite having a matrix of a benzoxazine-containing heat curable composition. Here, the matrix may include either pre-expanded thermoplastic particles or incompatible in situ-expandable thermoplastic particles. The composite has an essentially uniform density and thickness across the breadth of the composite and which possesses an external shape and size that is dimensionally similar to a hollow interior component of a structural material. In this embodiment, the fiber may be present as continuous filament, continuous tow, chopped or staple fibers, spunbonded fibers, fibrous mat or fibrous webs, or any combination of them. The fibers may be aligned essentially with the aspect orientation of the monolithic composite, assuming that the monolithic composite possesses an aspect orientation. In many instances, the fibers may be aligned in a single direction or more than one direction. For example, a filamentary tow may be used that has a twist, thus imposing an alignment in several directions all within the same fibrous component of the composite. The fiber reinforcement may be of organic or inorganic fibers. Here, at least a portion of the fiber reinforcement is made of a fiber that conducts heat better than the matrix resin of the composite. Most preferably, the fiber reinforcement is made of a metal or carbon-based material, such as steel, aluminum, graphite, non-graphitic carbon (including pitch based fibers), and can include high performance fibers such fibers from polyarylamides and polyarylimides, polyaromatic ether ketones, such as PEEK, PEK and/or PEKE, and the like. In a preferred embodiment, the fiber is a filamentary tow that is align centrally of the interior of the monolithic composite and extends from the bottom to the top of the monolithic composite.

The monolithic composite may also contain reinforcing fillers that are materials, which enhance the toughness or tensile strength of the resulting cured, expanded product. The fillers may be of any of the known types that are used in thermosetting resins for the enhancement of toughness and/or tensile strength in cured thermosetting resins. Fillers may be included solely or complimentarily for the purpose of altering the viscosity of the monolithic composite.

The invention relates to molding structures which function as solid adhesive structures, core fillers and reinforcement materials, and/or fasteners that rely on syntactic technology and are suitable for use in many different industries, such as aerospace, automobiles, building construction, and the like. A preferred application of the inventive sag-resistant nucleus-forming monolithic composite involves formulating the matrix resin into an adhesive such that it adhesively bonds to the wall(s) of the hollow interior component and forms an essentially faultless adhesive interface with the wall(s) of the hollow interior component. Because of the shape similarity of the inventive sag-resistant nucleus-forming monolithic composite, it is possible to produce solid adhesive structures, core fillers and reinforcement materials, and/or fasteners that are relatively easier to employ and which provide surprisingly better functionality. For example, U.S. Pat. Nos. 5,234,757, 5,397,611, 5,540,963, and 5,783,272 claim and describe syntactic foam films that are now commercially sold as SYNSPAND® expandable films, which may be multi-plied into larger structures that can fill up, e.g., an open space (or hollow core or open cell) of a honeycomb aerospace structure. However, because of the sagging characteristics of the SYNSPAND® expandable films, it is not possible to readily form a moldable structure that conforms to the dimensions of the open space or core that does not snag when introduced to the open space or hollow core of the honeycomb structure. Secondly, multi-plied structures are incapable of having variability in the reinforcement built into the plied structure without making different thin layers of SYNSPAND® expandable films with different reinforcement properties and plying such layers. Moreover, each of the layers must be laid up prior to inserting the multi-plied structure into the hollow core. That is a time consuming activity and the resulting plied structure must be caused to lose its pliability in order to avoid snagging on insertion into the hollow interior. In addition, SYNSPAND® expandable film layers that are extruded into a honeycomb take extensive time from lay-up of the layers to the extrusion and curing of the SYNSPAND® expandable films within the honeycomb. As pointed out above, SYNSPAND® expandable films, when shaped within a open cell of a honeycomb, will effect most of its expansion in the "z" direction because the SYNSPAND® expandable film is drawn into the open cell and is seized by the walls of the open cell. Expansions in the "x" and "y" directions are inhibit by the walls.

This invention effects reinforcement and/or stiffening of a structural member that contains a hollow interior portion. This is accomplished by forming a sag-resistant nucleus-forming monolithic composite from a matrix of a benzoxazine-containing heat curable composition with thermoplastic particles, which may be either pre-expanded or in situ-expandable. The inventive composite contains an essentially uniform density and thickness and possesses an external shape and size that is dimensionally similar to a hollow interior component of the structural member, for example, a honeycomb structure. This allows the monolithic composite to be inserted into the hollow interior portion of the structural member, such as a hollow cell of a honeycomb structure, without filling up the hollow interior portion. If the hollow interior portion contains more than one opening for inserting the composite, then that opening is closed off such as to allow the monolithic composite to reside wholly in the hollow interior portion. In the case of the inventive composite having in situ-expandable thermoplastic particles, then the hollow interior portion is heated sufficiently to cause the matrix resin of the monolithic composite to flow and the in situ-expandable thermoplastic particles to simultaneously isotropically expand whereby the composite uniformly expands in essentially all directions (i.e., the "x", "y" and "z" directions) or essentially in the "x" and "y" directions, to cause the formation of a syntactic foam, especially a closed cell syntactic foam, that has an essentially uniform microcellular structure and a more faultless interface with the wall(s) of the hollow interior portion of the structural member, e.g., the honeycomb structure. In other words, it is the viscosity reduction of the matrix resin that allows the expansion agent in the in situ-expandable thermoplastic particles to force expansion of the thermoplastic resin in which it is embedded. With the matrix resin phase changes, there is a commensurate expansion of the expansion agent in the expandable particles, to where expansion is finally constrained by the matrix resin reaching a state of gelation that puts a constraint on expansion agent expansion. The matrix resin is allowed to cure to form a degree of stiffness that is sought for the syntactic foam. An adhesive layer can be placed over the opening to the hollow interior portion during such expansion whereby the expanded monolithic syntactic foam composite material adhesively and integrally bonds to the adhesive layer. If desired, a metal or plastic layer can be placed over the opening to the hollow interior portion during such expansion and the expanded monolithic syntactic foam composite material adhesively and integrally bonds to the metal or plastic layer. If desired, a sealing plate that does not bond to the expanded monolithic syntactic foam composite material can be used instead. It can be removed after expansion is complete.

Another embodiment of this invention is a sag-resistant nucleus-forming monolithic composite having a matrix of a benzoxazine-containing heat curable composition that is filament fiber reinforced and can be adhesively anchored in a hollow interior of structural member. In particular, this embodiment contemplates creating at least one hollow interior that extends through a plurality of layers of a composite and fills such hollow interior with the fiber reinforced sag-resistant nucleus-forming monolithic composite of the invention, and through thermal expansion of the monolithic composite (in the case of the inventive composite having in situ-expandable thermoplastic particles), forming adhesive anchoring in each layer of the composite through which the hollow interior extends, thereby reinforcing and fastening the composite into a reinforced structure. This embodiment of the invention is especially applicable to use in reinforcing honeycomb structures by including in the monolithic composite the filament fiber component such that it is aligned from surface to surface of the honeycomb structure, and through adhesive layers provided onto such surfaces prior to the curing and expansion of the monolithic composite, the filament fibers become bonded to the adhesive layers, thereby greatly reinforcing the strength of the honeycomb and any film that is bonded to the adhesive layers on the side thereof oriented away from the honeycomb structure. Sandwich structures having great strength and utility can be made comprising outer layer (such as films of metal, plastic, paper, fiber reinforced layers, and the like), followed by an uncured adhesive layer, the honeycomb filled (in whole or part) with the uncured and unexpanded monolithic composites of the invention, another adhesive layer, another similarly filled honeycomb layer, an additional adhesive layer, and lastly, another outer layer. This sandwich structure can be subjected to heat and pressure so as to facilitate the isotropic expansion and curing of the monolithic composites and the curing of the adhesive layers. This will produce a multifaceted composite having great utility in a variety of area, such as in aerospace, automotive structures, building structures and the like.

A further embodiment of the invention relates to advancing the reinforcing and fastening of a composite as set forth in the preceding paragraph. In this further embodiment, the sag-resistant nucleus-forming monolithic composite of incompatible in situ-expandable thermoplastic particles in a benzoxazine-containing heat curable composition that is introduced into the common hollow interior of the composite to be joined, has at least one end portion that extends outside of the composite's external surface, and during heat expansion of the monolithic composite, the end portion is allowed to expand greater than the confinement space limiting expansion that occurs within the hollow interior. That end portion can be pressed during the curing process to force the resin and reinforcement fibers thereat to expand beyond the size of the diameter of the opening of the hollow interior at the external surface of the composite. By applying a closed pressure on the end portion, it is flattened to some degree to form an expanded syntactic foam fiber-reinforced fastener head terminating the syntactic foam derived by heat expansion of the sag-resistant nucleus-forming monolithic composite.

Fastening pressures can be increased in fiber-reinforced syntactic foam formed by the heat expansion and curing of the sag-resistant nucleus-forming monolithic composite by utilizing heat curable composition having a controllable degree of shrinkage during cure, thereby causing the fiber reinforcement to become more taut within the syntactic foam.

The advantage of such a fastener structure is the fact that only one end of the hollow interior need extend through the surface of the composites outer surface. Also, anchoring of the inventive syntactic foam into the hollow interior can be enhanced by varying the diameter of the hollow interior such that the syntactic foam is allowed to be more expanded in portions of the hollow interior, especially at a distance from the open end of the hollow interior exiting the outer surface of the composite being fastener-reinforced.

In a further embodiment of the invention, it is desired that during the process of converting the expandable version of the sag-resistant nucleus-forming monolithic composite a syntactic foam that the temperature applied be sufficiently high enough to cause expansion of the thermoplastic particles prior to the gelation of the benzoxazine-containing heat curable composition. This allows the in situ expandable particles to expand in a matrix that normally before gelation will have lost some viscosity thus favoring the expansion process, and which upon gelation will impede the expansion of the in situ expandable particles by the increase in viscosity.

This invention relates to a process for reinforcing and/or stiffening a honeycomb structure which comprises inserting into a select hollow interior portion (i.e., hollow core, cell, holes or wells) of a honeycomb structure, a preformed sag-resistant nucleus-forming monolithic composite of in situ-expandable thermoplastic particles, which form closed-microcells upon isotropic expansion, in a matrix resin, which composite possesses an external shape and size that is dimensionally similar to the hollow interior portion of the honeycomb, heating the composite to a temperature which causes isotropic expansion of the in situ-expandable thermoplastic particles in the composite and expansion of the composite within the interior portion honeycomb structure to achieve a faultless interface with the wall of the interior portion honeycomb structure.

Another embodiment of the invention involves processes for forming the preformed sag-resistant nucleus-forming monolithic composite of in situ-expandable thermoplastic particles, which form closed-microcells upon isotropic expansion, in a benzoxazine-containing heat curable composition, of the invention. These monolithic composites may be made by extrusion, pultrusion or casting processes. In these processes, all of the components for making the monolithic composite are blended in conventional mixing equipment, with the exception of any continuous fibrous component that becomes a component of the monolithic composite. In the absence of any continuous fibrous component the blend of components may be extruded or casted to the desired monolithic composite shape. When continuous fibrous components are incorporated into the monolithic composite, it is desirable to make the monolithic composite by pultrusion processes. The desired length of the monolithic composite in the case of extrusion and pultrusion may be achieved by cutting the exudates with a knife or other cutting device. The length of the composite in the case of casting is determined by the size and shape of the mold used in casting.

BRIEF DESCRIPTION OF THE DRAWINGS

FIG. 8 is a collection of figures, in which

DETAILED DESCRIPTION OF THE INVENTION

Figure 1:
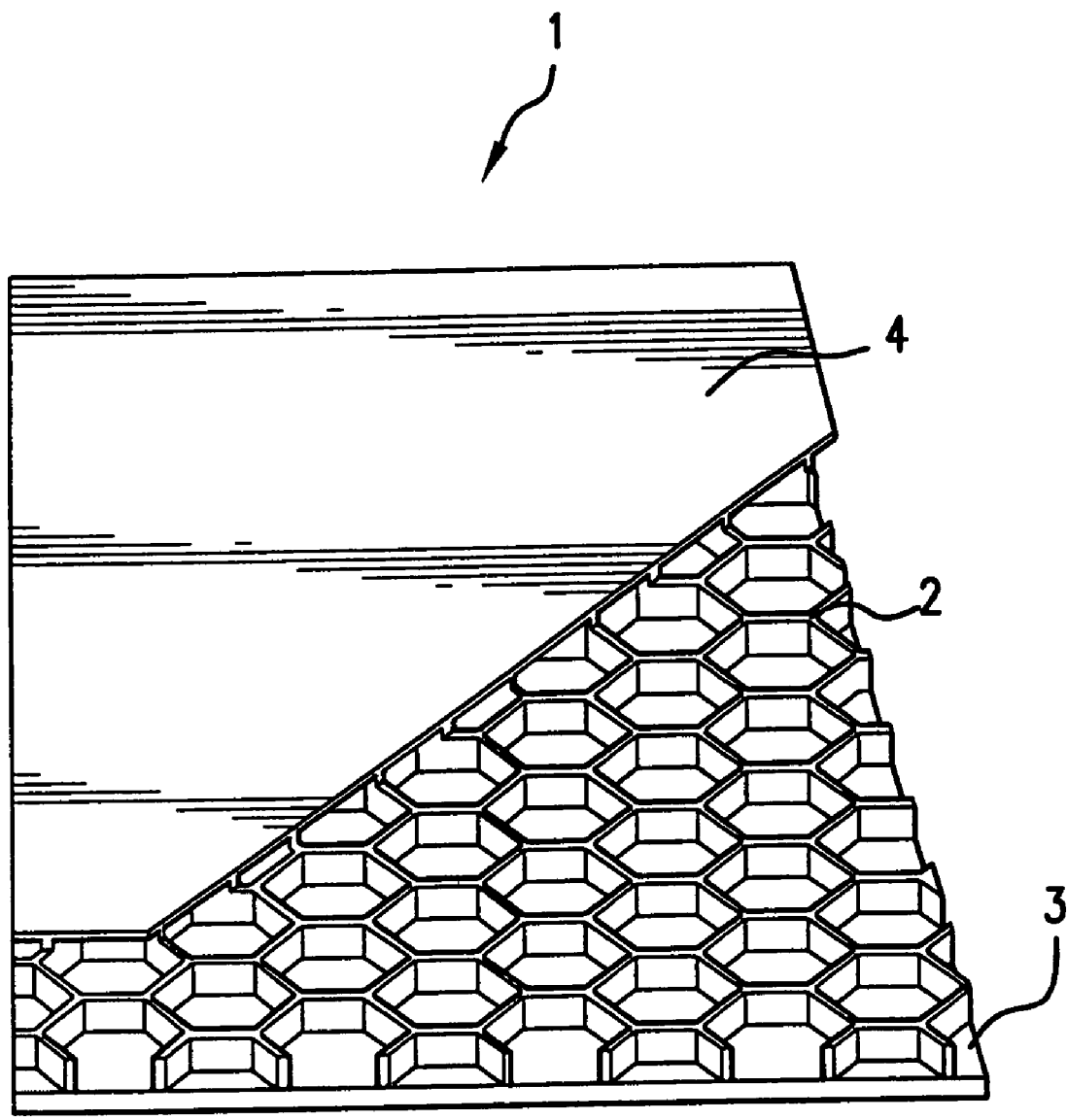
FIG. 1 is perspective view of a section of a prior art honeycomb structure.

SYNSPAND® expandable films have made major advances to the employment of syntactic foam films, especially in aerospace applications. As noted previously in U.S. Pat. Nos. 5,234,757, 5,397,611, 5,540,963, and 5,783,272, syntactic foams, such as SYNCORE® syntactic foams, are typically used in stiffness critical applications. The bending stiffness of a structure is proportional to the third power of thickness ($T^3$). A relatively slight fluctuation in thickness will result in a significantly large variation in stiffness. That art teaches us that controlling the film thickness is a crucial manufacturing parameter in making a molded composite structure from syntactic foams. Space volume (foam cells) in thin uniform syntactic foam films such as SYNCORE® syntactic foam films is achieved by substituting light hollow microspheres for the relatively dense matrix resin on a volume to volume basis. A physical barrier and a process obstacle limit the amount of space volume that can be achieved.

The physical barrier occurs at maximum packing fraction. Recognizing that the objective involves packing spheres into a fixed volume, maximum packing occurs when point-to-point contacts are developed between adjacent/nearest packing spheres. Beyond this point, it is physically impossible to pack any additional spheres into this fixed volume. For monodispersed spheres, this represents about 64% of the packing volume. In commercially available multi-dispersed sphere systems, the weight reduction is limited by the particular packing fraction of the system.

From a processing standpoint, adding glass microspheres to a matrix resin increases resin viscosity, similar to that of adding fillers or thixotropic agents to the resin. This viscosity increase is due to an interaction between the flowing resin and the surface of the sphere. In simplistic terms, as the resin moves past a sphere, it imparts an equal and opposite drag force on the surface of the sphere and develops a shear stress through the center of the sphere. Typically, the shear strength of hollow spheres is low and during processing the resin's viscosity increases proportionally to the volume of hollow spheres added. As a result of the proportional increase in shear stress caused by the increased viscosity of the resin, sphere damage/fracture occurs. This shear stress is the primary cause of sphere damage/fracture during processing. Once the spheres are damaged, the weight saving advantage from the use of hollow spheres is negated.

In the version of the invention in which in situ expandable thermoplastic particles are used, the invention establishes that these sphere related limitations are avoided by in situ generating microspheres from a thin film to produce a thin (albeit thicker) syntactic foam film. These in situ-expandable thermoplastic particles possess behavior and processing characteristics similar to pigments and fillers. The average particle size of the thermoplastic in situ-expandable particles is typically an order of magnitude, or more, smaller than the pre-expanded hollow sphere used in commercial thin film syntactic foams. For example, for a given volume, a significantly greater number of unexpanded particles may be added to a given volume of resin compared to the pre-expanded spheres. Since expansion takes place in situ during the cure step, the shear sensitivity of pre-expanded hollow spheres does not become a problem.

The packing of the expanded spheres is also more efficient because of in situ expansion. During cure, the viscosity of the matrix resin, even though processable at normal handling temperatures, such as at about room temperature (about 15-37° C., though variable from application to application), decreases with increasing temperature and since the unexpanded spheres are not in a point-to-point contact configuration, their environment is mobile and this allows each particle to expand within the film. This mobility results in a more densely microsphere-packed lattice. However, in the general practice of the invention, the film will be cut to the size of the mold. As a result, because the expansion forces are three-dimensionally directed, this mobility is initially primarily in the upwardly "z" direction rather than in the laterally "x" and "y" directions. As expansion takes place, the film's edge surfaces enlarge, so they expose more particles to heat through the edge surfaces. As a result, more of the particles at the edge surfaces initiate expansion so that a greater proportion of the particles continue to expand in the "z" direction.

Having the film placed in the mold such that the edges of the film abut or essentially abut the wall or walls of the mold further magnifies the upward expansion. The confining walls inhibit the free expansion of the particles into microspheres so that the internal expansion forces in the particles at the walls are directed more in the z direction initially. One might expect that the edges of the film would rise to greater heights in an otherwise vertical free expansion, but this is not the typical case. Free vertical expansion of the film results in a generally uniform rise of the film. This means that the surfaces of the expanded film, which eventually contact the walls of mold, are essentially uniform in thickness resulting in a molded product of exceptional uniformity both in density but also in surface skin thickness at the edges and surfaces.

However, when SYNSPAND® expandable films are applied across the open mouth of an open-cell of a structure, the application of heat will cause the resin therein to lose viscosity and cause the film to sag. The sagging film drapes into the opening of the cell in the shape of a concave film, and with expansion occurring in the "z" direction, opposite portions of the same film surface are facing or essentially facing each other and expansion from those portions will meet at some intermediate space. Consequently, a resin interface will be formed and the extent of the interface representing a seamless fault line within the expanded film will depend on the viscosity of the resin and the ability of the resin to repair a fault line in the film. Even should a seamless fault line be created, there is the possibility that the fault line represents a weakness in the syntactic foam. In addition, with expansion of the sagging film occurring at the interior of the concave interior of the film, there is the possibility that the density at the interior of the expanded and cured film will be lower than at the wall of the open-cell structure.

Should one use multi-layers of SYNSPAND® expandable films to fill the openings of an open-cell structure, then the same issue relating to fault lines extends to the joining of the oppositely facing surfaces of the films during their expansions.

This invention encompasses sag-resistant monolithic composites that are essentially uniform and substantial in size relative to the open cell in which they are placed or are inflexible in quality or character. This means that composite is firm enough to be placed in the open-cell and large enough to be readily expanded to the size of and conform to the dimensions of the open-cell. The composite of the invention will typically have one dimension greater than the other, and typically, the greater dimension configures with the greater dimension of the open-cell into which the composite is placed. As a result, it is expected that the composite of the invention will possess an aspect ratio conforming to or similar to the aspect ratio of the open-cell. In most of the cases, the monolithic composite of the invention will have the appearance of a plug that conforms generally with the geometry of the open cell of the structure into which they are placed. General conformity does not require that the plug replicate the geometry of the open cell, merely that the plug is capable of expanding uniformly within the open cell and seamlessly bond to the wall(s) of the open cell. However, the plug can replicate the geometry of the open cell.

In addition, the plug is typically sufficient to expand and seal the open cell into which it is placed. In the usual case, one plug is sufficient for sealing a single open cell. Some may seek to avoid this invention by using the advantages of the invention and contend non-infringement by virtue of using more than one plug per open cell. Though such use would not be advantageous over a single plug use, such use would be equivalent in performance so long as any interface between the plugs during expansion is totally seamless. Such is contemplated as being within the claims of this invention.

The monolithic composites or plugs of the invention are easily placed in the open cell of the structure. For example, a plug may be physically, by hand, dropped into an open cell of a honeycomb. In most cases, that will be the preferred manner of employing the plugs. However, more automatic means may be used to deliver the plug to the open cell. For example, plugs may be fed to a stream of gaseous liquid nitrogen temperature moderated with another gas at ambient temperature so that if the plugs are made with a thermosettable matrix resin that is curable with heat, the temperature can be controlled to reduce, if not eliminate, plug cure advancement. The stream acts as a pneumatic force for delivering the plug through a flexible tube to a delivery system at the end of the tube for insertion into the open cell. The delivery system may be a device that functions like a leaf blade shutter type aperture that opens and seals a flexible tube through which the plug is delivered. The leaf blade shutter comprises overlapping sliding blades that can be simultaneously opened or closed to either open up or seal an opening as a leaf shutter opens and closes a lens aperture. The delivery system can be opened or closed depending on use. For example, the shutter blades, located over an open cell, can be opened to allow the gas stream to force a suspended plug into an open cell. The shutter blades can be put into the closed position with the delivery of a single plug to a single open cell. This can be repeated without injuring any of the plugs or allowing any of the plugs to advance in cure. The temperature of the gas stream can be kept below room temperature to about –40° C., if desired. The shutter blades may be controlled mechanically or electronically, just as they are in a camera lens operation. The pneumatically employed vaporized liquid nitrogen may be allowed to exhale from a tank into a gas jet line to which is added a stream of air. The rate of vaporization of the liquid nitrogen is controlled to assure that the temperature of the combined stream of stream of air/nitrogen. The temperature of the combined stream of air/nitrogen is monitored by one or more thermocouples to assure that the temperature of the combined stream is that which sought. That combined steam can be fed to a plug insertion tube that contains an opening through which a plug is allowed to deposit into the cold stream. The plugs are kept in a plug repository tube, one end of which connects with the stream and contains a similar shutter leaf blade shutter that opens and closes in concert with the leaf shutter aperture that opens and seals the device delivery system. The other end of the plug repository tube is open to the operator and allows for the introduction of plugs to the tube. When a plug is delivered to the open cell, another plug is automatically swept into the combined stream, and the process is repeated at another open cell. Other devices for delivering the plug will become apparent to the user of the invention.

The composite of the invention can be made in a number of ways and with a variety of resin systems to achieve the advantages herein set forth. The formulation of the film will be dictated by the specific end-use application of the plug and the resultant molded syntactic foam, as well as the method employed in making the plugs. Therefore, it is not intended that this description should be limited to any specific application and to any specific formulation and process of manufacture.

The plugs of the invention may be made by a number of processes. If the plug does not contain filament fibrous material extending from surface to surface (i.e., unidirectionally aligned), then the preferred method of making the plugs is by extrusion or cast molding. If the plug is to contain a monofilament fibrous matter that extends from surface to surface (i.e., unidirectionally aligned), then the preferred method of manufacture is by pultrusion and cast molding. In any case and process, the first stage requires the mixing to uniformly distributed the thermoplastic particles with a benzoxazine-containing heat curable composition. Such mixing may be effected in a standard extruder or dough mixer of the type that is used in mixing such types of mixtures to effect uniform distribution. Other materials are typically included in the matrix resin/thermoplastic particles mixture ("matrix resin/particle mixture") that affect some of the flow properties of the matrix resin/particle mixture, as well as physical properties of the ultimate expanded plug made therefrom.

Pultrusion is a well-known continuous, automated closed-molding process that is cost-effective for high volume production of constant cross section parts. The process relies on reciprocating or caterpillar-type puller/clamping systems to pull fiber and resin continuously through a heated steel die. Roving (either of spun staple fiber or continuous filament fiber) is pulled from material racks and is then wet out, typically in an open resin bath. In the case of this invention, the matrix resin/particle mixture typically has a higher viscosity than the typical resin system used in pultrusion. To compensate for this, it is desirable to extrude the matrix resin/particle mixture as a flowing viscous mixture, frequently possessing the consistency of a paste, around the fiber component. Using the compositions of the invention, the die is sized to accommodate the fiber component and the matrix resin/particle mixture extruded around and about the fiber component. The compacted package then enters the die, where the part is cooled to effect the elongated shape of the ultimate plug. The shaped part is pulled out of the die and, finally, into a saw system at the end of the machine. The saw travels downstream while it cuts the part to a pre-set length desired for the plug. Puller and saw motions and speed are synchronized, usually through computer controls. Multiple streams can be pultruded in a single die with several cavities. To form hollow or multiple-cell parts, the material typically wraps around heated mandrels that extend through the die.

If off-axis structural strength is required by the part application, mat and/or stitched fabrics may be folded into the material package before it enters the die. This can add substantial loads to the machine frame and pulling system. Hydraulically driven systems capable of pulling up to 100,000 lbs. And 103-inch wide by 15 inch deep structural profiles are in use today.

Heat control is a recognized significant variable, and commercial pultrusion apparatus utilize controllers that monitor and maintain a pre-set temperature in various zones throughout the die and mandrels. For all-roving pultrusion, where a radio frequency ("RF") generator may be used in the typical pultrusion to accelerate cure by pre-heating the wet material package (where the RF energy initiates cure before the material enters the die, thereby reducing cure time in the die and increasing running speeds), in the practice of this invention however, RF generators are typically replaced with cooling chambers before entering the die, thus slowing down any cure so that the resulting extrudate can be cut into plugs that are curable when deposited into open cells, allowing expansion of the plugs within the open cells.

In the typical case, the matrix resin will be a thermosettable resin, e.g., polyester, vinyl ester, epoxy and phenolic. However, thermoplastic pultrusion technology brings the strength, toughness, reformability and repairability of thermoplastic composites to pultruded parts and structural shapes. The process essentially reverses thermoset pultrusion, in that the thermoplastic is heated to soften it, and cooled to harden it. In the case with this invention, using a matrix resin/particle mixture where the matrix resin is a thermoplastic, heating is preferred before entry to the die because heating does not permanently set the plug that is generated from the pultruder.

Extrusion and casting are well known industrial techniques. In the practice of this invention, the combination of the matrix resin/particle mixture, with or without the inclusion of reinforcing staple fiber, are extruding as a flowable mass through dies containing orifices of the appropriate size for making an elongated rod having the diameter (or its equivalent for shapes other than a cylinder) that may be sawed to the size desired for the plug. In casting, dough mixed or extruded masses of the matrix resin/particle mixture may be poured into casting forms sized to conform to the shape of the desired plug.

The drawings illustrate schematically some of the structure and processes for effecting this invention. FIG. 1 is perspective view of a section of prior art honeycomb structure 1, which comprises honeycomb core 2, honeycomb bottom surface panel 3 and honeycomb top surface panel 4. In this depiction, the depth of core 2 appears relatively shallow. In most cases, the depth of core is greater than its diameter.

Figure 2:
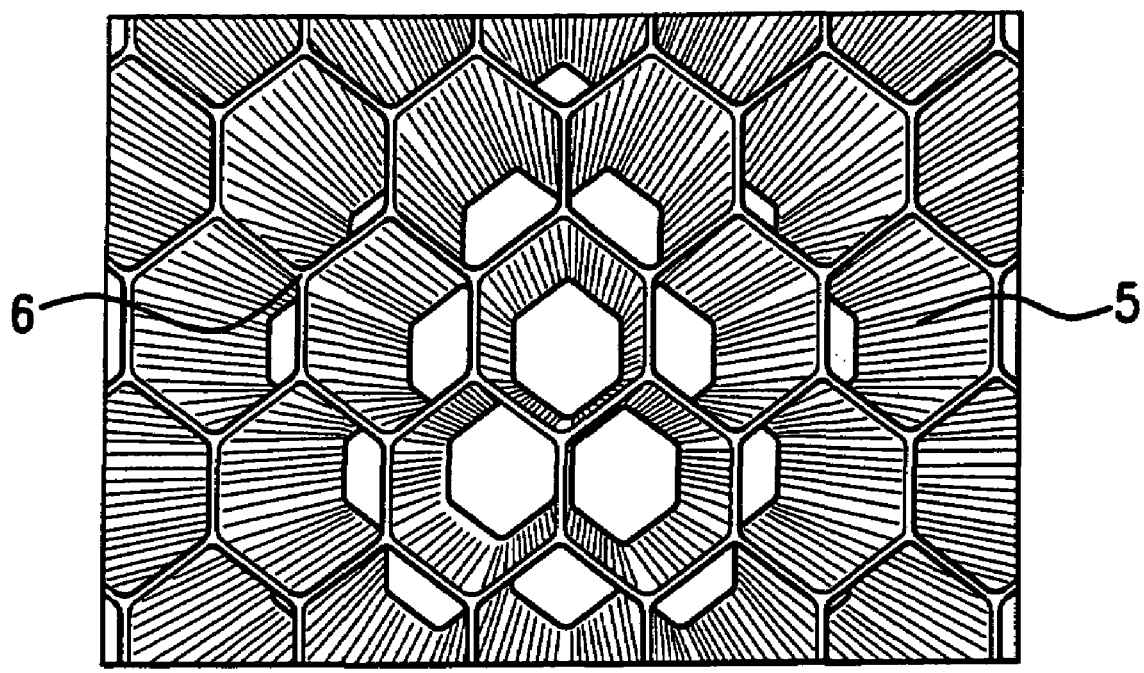
FIG. 2 is a perspective view of a prior art honeycomb core.

FIG. 2 is an overhead perspective view of a prior art honeycomb core, which comprises honeycomb core opening (i.e., core well) 5 and honeycomb core wall and wall edge 6.

Figure 3A:
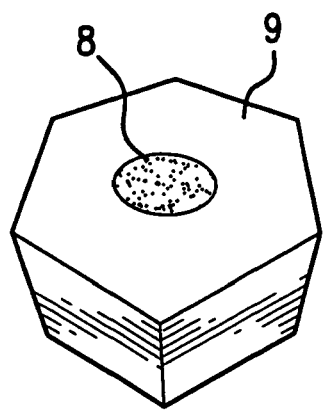
FIG. 3 comprising FIGS. 3a, 3b and 3c, which depict different shaped monolithic composite inserts for honeycomb core, such as depicted perspectively from the top in FIG. 3d.
Figure 3B:
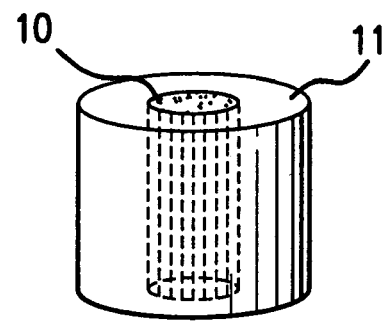
Figure 3C:
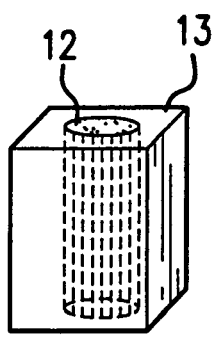
Figure 3D:
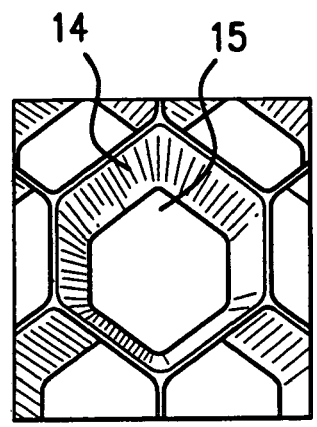

FIG. 3 comprises FIGS. 3a, 3b and 3c, which depict different shaped expandable monolithic composite inserts (or plugs) of the invention for honeycomb core, such as depicted perspectively from the top in FIG. 3d. FIG. 3a is a perspective view of a hexagonal shaped plug of the invention that corresponds to the shape of honeycomb core 15 of FIG. 3d. Matrix resin/particle mixture 9, which is the resin component of composite containing thermoplastic particles, has a conventional hexagonal shape. In this embodiment of the plug, matrix resin/particle mixture 9 embraces in this case a reinforcing fibrous core 8. The reinforcing fibrous core 8 may be made of continuous filamentary tow, yarn, and the like. It also may be made of spun continuous filament or staple yarn. If the yarn is made from staple fiber, it is preferred that the yarn has a twist or false twist. In many embodiments of this invention, a plug suitably containing matrix resin/particle mixture can be free of a fibrous core within the matrix resin/particle mixture. Instead, the matrix resin/particle mixture may contain reinforcing staple fiber uniformly dispersed therein. In the case of FIG. 3b, matrix resin/particle mixture 11 corresponds to matrix resin/particle mixture 9 in description. In FIG. 3b, matrix resin/particle mixture 11 has a cylindrical shape, and embraces an optional fibrous core 10, which corresponds to fibrous core 8 in description. The plug characterized in FIG. 3b is suitable for insertion into any shaped core of a honeycomb, such as honeycomb cores that are cylindrical, rectangular or hexagonal (viz., FIG. 3d). FIG. 3c depicts a perspective view of a rectangular shaped plug containing matrix resin/particle mixture 13, which corresponds to matrix resin/particle mixture 9 in description, and an optional fibrous core 12, which corresponds to fibrous core 8 in description. Any of the shaped plugs of FIGS. 3a, b and c can be inserted into hexagonal core 15, so long as their shape is smaller in dimension to that of core 15. The size of plug is determined by the degree of expansion that is designed into the formulation of the matrix resin/particle mixture and the density of the expanded plug that is desired.

Figure 4:
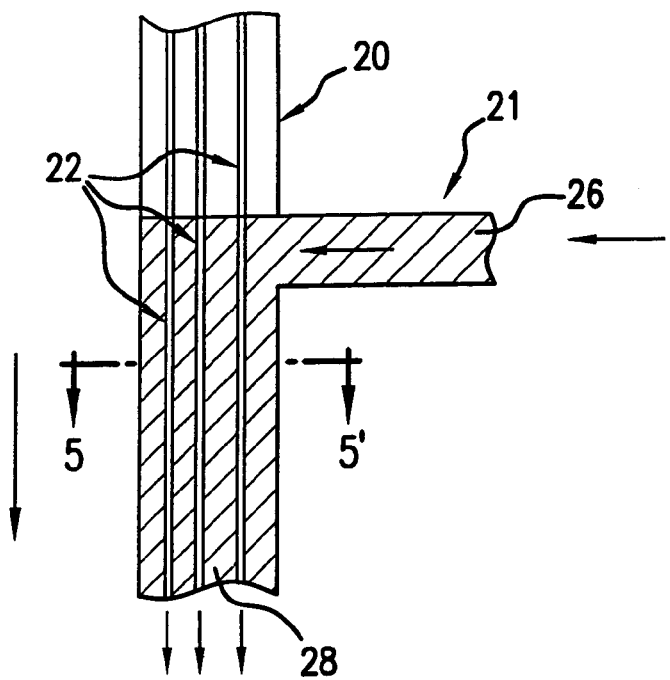
FIG. 4 comprises a sectional view of an extrusion/pultrusion apparatus for making monolithic composites of the invention.

FIG. 4 comprises a sectional view of a simplified extrusion/pultrusion apparatus for making monolithic composites of the invention. The apparatus comprises a pultrusion chamber 20, typically cylindrical, rectangular or hexagonal in shape, a matrix resin/particle mixture flow line 21 and an upper zone where fibrous components 22 are transported into contact with the matrix resin/particle mixture, and an outlet section 28. The matrix resin/particle mixture 26 [resin component flow of composite containing thermoplastic particles essentially uniformly dispersed in a benzoxazine-containing heat curable composition] is transported through flow line 21 from a standard screw extruder (not shown) into chamber 20. A suitable extruder is a twin screw extruder, available commercially from Theyson America, Inc., Charlotte, N.C. Fibrous components 22 are pulled though chamber 20, and the number of fibrous components 22 can range from 1 to hundreds in number depending on their size and weight and the degree of reinforcement sought for the plugs of the invention. The matrix resin/particle mixture 26 is forced around fibrous component 22 in chamber 20 and the flow of the composite is passed from section 28 through the orifice dies opening and saw resulting in formation of the plug. A conventional knife cutter (not shown) is downstream of composite 28 serving to cut the composite to any convenient size for use, such as the depth of the honeycomb core into which the composite is to be inserted. The resulting monolithic composite contains thermoplastic particles essentially uniformly dispersed in a benzoxazine-containing heat curable composition that is incompatible with the particles, in this illustration, having a cylindrical shape, embracing the fibrous strands 22 and suitable for insertion into any shaped core of a honeycomb, such as honeycomb cores that are cylindrical, rectangular or hexagonal.

Figure 5:
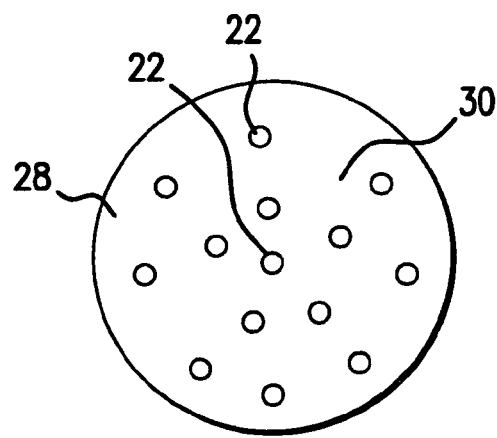
FIG. 5 is a cross-sectional view of monolithic composite taken along lines 5-5'.

FIG. 5 is a schematic cross-sectional view of monolithic composite system in which the matrix resin/particle mixture is in the state of flow before plug formation, taken along lines 5-5'. The number of component 22 may vary as indicated above.

Figure 6:
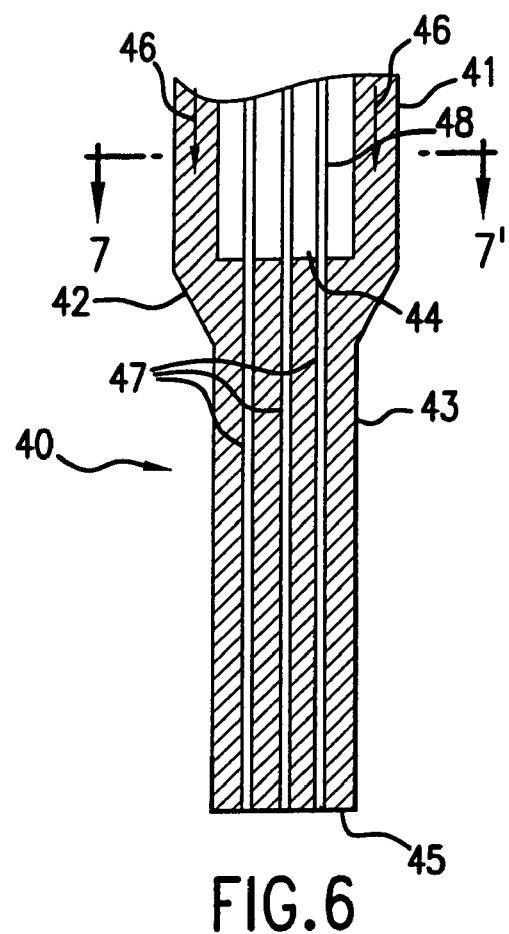
FIG. 6 is a sectional schematic view of a segment of pultrusion apparatus for making the monolithic composites of the invention.

FIG. 6 is a schematic sectional view of segment 40 of a pultrusion apparatus for making the monolithic composites of the invention. It comprises a cylindrical feed section 41, a matrix resin/particle mixture cylindrical delivery section 41 for flow of matrix resin/particle mixture from an extruder (not shown) in the direction of flow 46, a conical throat channel 42 for forcing the matrix resin/particle mixture into the fibrous component feed 47, a fibrous feed section 44 sealed from section 41 for transporting fibrous components 47 to blending channel 43 wherein the matrix resin/particle mixture wets the fibrous components 47, and an open bottom 45 that feeds to the orifice of the die. The orifice of the die may have a diameter, or its equivalent in the case of other shapes, that is equal to that of blending channel 43.

Figure 7:
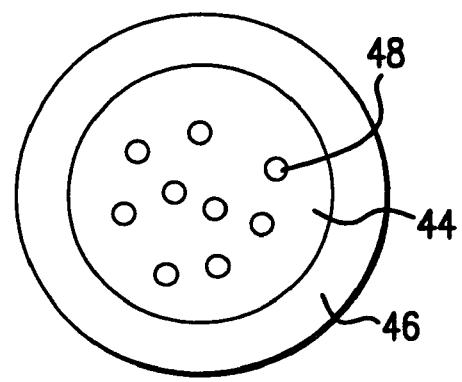
FIG. 7 is a cross-sectional schematic view of FIG. 6 taken along lines 7-7'.

FIG. 7 is a schematic cross-sectional view of FIG. 6 taken along lines 7-7'. In this figure, the fibrous components 48 exceed the number shown in FIG. 6, illustrating the fact that fiber reinforcement may vary considerably pursuant to this invention.

Figure 8A:
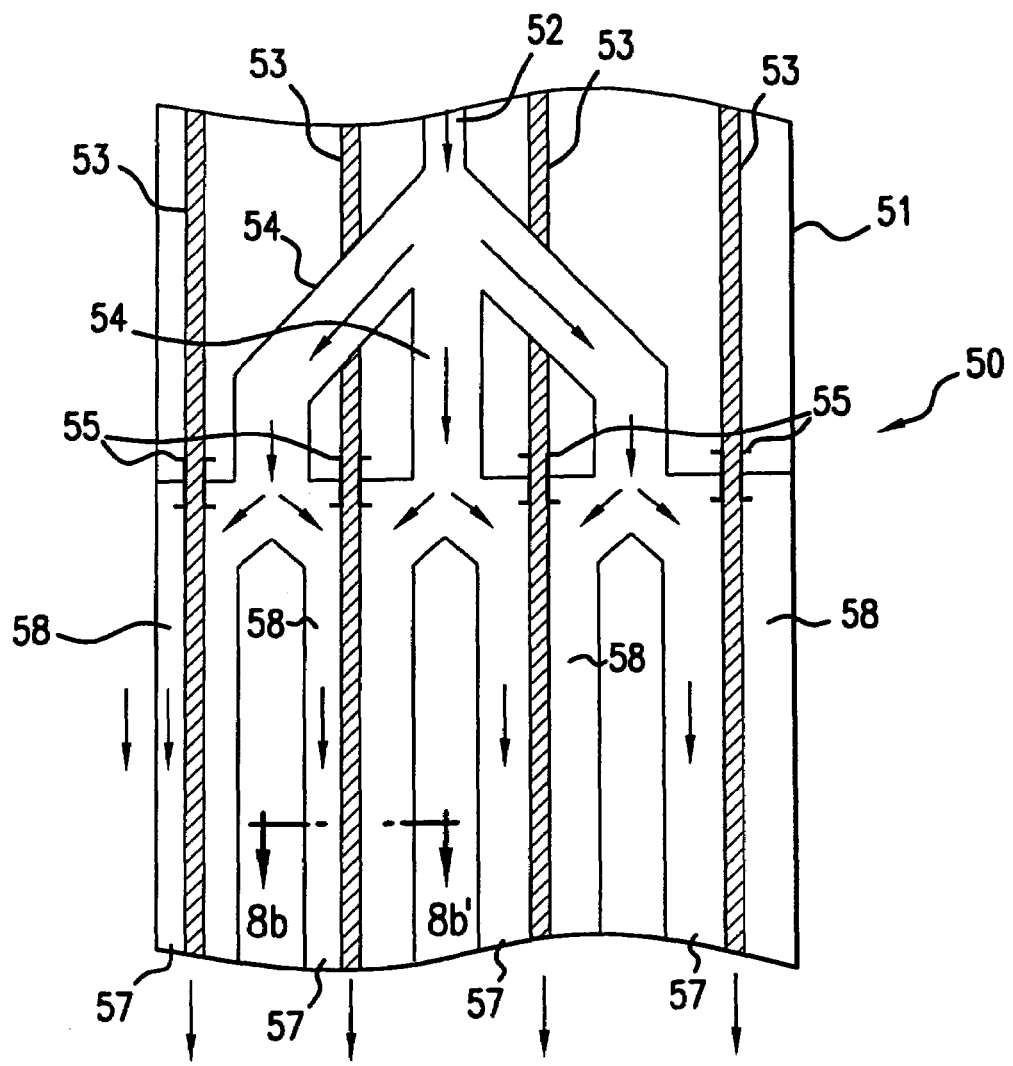
FIG. 8a is a sectional schematic view of a segment of a multi-orifice pultrusion apparatus for making the monolithic composites of the invention and FIG. 8b is the cross-sectional view along line 8-8'.
Figure 8B:
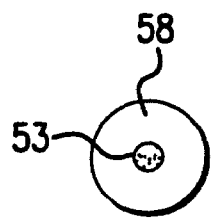

FIG. 8a is a schematic sectional view of a segment 50 of a multi-orifice pultrusion apparatus for making the monolithic composites of the invention. FIG. 8b is the cross-sectional view along line 8-8'. It comprises upper cylinder cover and outside wall of fibrous feed section 51 of the apparatus above blending channels 56; central cylindrical feed line 52 for delivering matrix resin/particle mixture from an extruder (not shown); fibrous component feeds 53 are transported to blending channels 58 through sealing sleeves 55; matrix resin/particle mixture feed channels 54 connecting matrix resin/particle mixture feed section 52 and blending channels 58; matrix resin/particle mixture fed to line 52 is delivered to channels 58 to impregnate fibrous components 53 and the composite is transported through channel openings 57 to dies (not shown) and cutting mechanisms (not shown) to make the plugs of the invention.

Figure 9A:
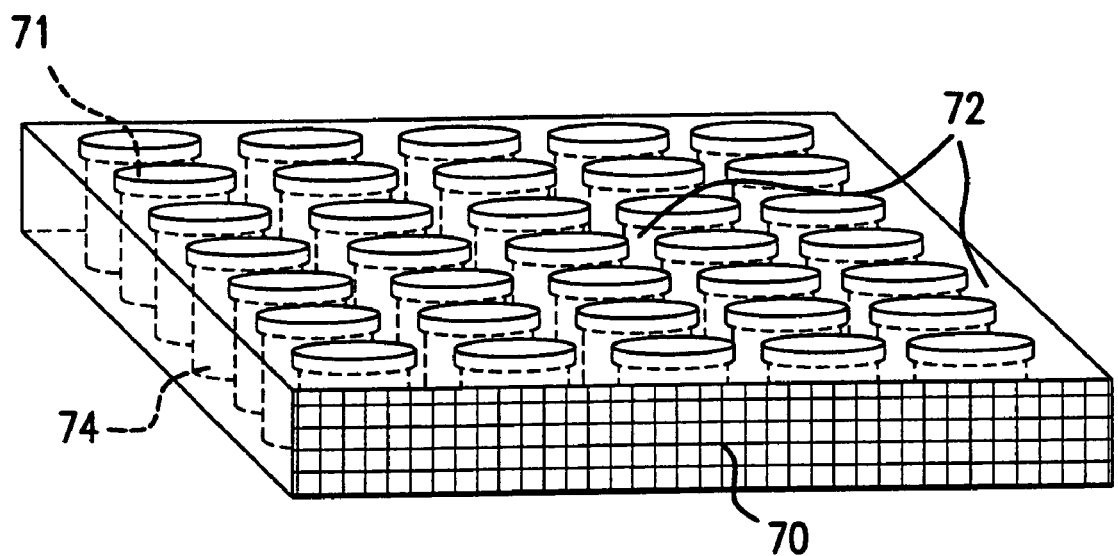
FIG. 9 comprises FIG. 9a showing a casting tray for making a monolithic composites of the invention, as shown in FIG. 9b.
Figure 9B:
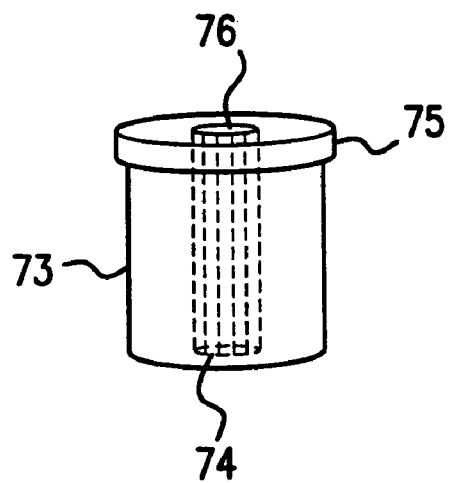

FIG. 9 comprises FIG. 9a showing a casting tray 70 for making a monolithic composite 73 of the invention, as shown in FIG. 9b. Tray 70 is made of any of a variety of materials 72, such as metal (e.g., steel, aluminum, metal alloys, etc.), ceramics, plastic composites, and the like, contains casting wells that replicate the dimensions of monolithic composite 73. The top of the plug 74 (which replicates the bottom of casting well 71) optionally contains a centrally fitted core indentation into which in casting well 71 fibrous filamentary material 76 are frictionally engaged and held during the casting process. The presence of the fibrous filamentary material 76 is optional to the practice of the invention. In the embodiment of FIG. 9, plug 74 contains a rim 75 which provides physical stability when the plug is placed into the core of a honeycomb. Rim 75 may be the base of the plug when deposited into a honeycomb core, or it may be the top of the plug in the honeycomb core. If desired, the plug may be made free of a rim.

While the thermosetting matrix resin suitable for use in the invention comprise those typically used in the manufacture of SYNSPAND® expandable films and SYNCORE® syntactic foams, in a particularly desirable aspect of the invention, the thermosetting matrix resin is a benzoxazine-containing one. For example, those thermosetting matrix resins used in the manufacture of SYNSPAND® expandable films and SYNCORE® syntactic foams may be epoxies, which cure at 350° F. (177° C.) and 250° F. (121° C.) and are the most common matrix resins, but matrices of bismaleimide ("BMI"), phenolic, polyester, PMR-15 polyimide and acetylene terminated resins that have been used to produce SYNCORE® syntactic foams, are usable in the practice of the invention. However, the invention includes as well, other thermosetting resins; indeed, the invention includes the family of thermosetting resins. For example, thermosetting resins from acrylics, polyurethanes, free-radically induced thermosetting resin, and the like, may also be used in the practice of the invention. And as noted, the invention in a particularly desirable aspect provides for the use of benzoxazine-containing heat curable compositions, either with pre-expanded thermoplastic particles or in situ expandable thermoplastic particles dispersed therein. As a result of such considerable choices in thermosetting resins, in situ-expandable thin films may be tailored to making syntactic foams for a wide variety of applications.

In addition, the matrix resin may include a thermoplastic resin as well. Suitable thermoplastic resins are those that have a melting point below the melting point of the in situ-expandable thermoplastic particles, examples of which include the nylon resins, the polyphenylene oxide resin, e.g., the phenoxy resins, such as BAKELITE® phenoxy resin PKHC, the GE PPO resins, the GE NORYL GTX®, which is a PPE/PA blend—a polyamide ("PA") product which is reinforced with modified polyphenylene ether polymer ("PPE"), the GE NORYL modified PPE/PS blend, BP Amoco Chemicals' RADEL®, UDEL® and MINDEL® sulfone polymers, BASF's ULTRADUR for partly crystalline, thermoplastic saturated polyester based on polybutylene terephthalate ("PBT"), polycarbonate resins (e.g., GE's LEXAN resins), polyethylene terephthalate and copolymers with isophthalate, and the like.

Many thermosetting resins are solids at about 23° C. and many of them are liquids at this temperature. Both kinds of resins can be made processable or extrudable. For example, a resin that is solid and a resin that is liquid can be combined to form a mixed resin system that is processable or extrudable. In addition, a solid or liquid thermosetting resin can have incorporated in it a variety of diverse materials which will render the resin more or less process at conventional handling temperature conditions and pourable at room temperature (about 15-37° C.). Conventional handling temperatures are defined as a temperature of between about −20° C. to about 43° C.[2]

[2] This range reflects the fact that material handling can require low temperature storage to preclude premature reaction of the thermosetting resin system and relatively high temperatures because the film may be used on a hot factory floor.

Though the thermoplastic particles will render a liquid thermosetting resin more viscous, they alone are not effective for making rendering the resin processable. If the thermosetting resin is solid, it can be calendared into a film by melting the resin with heat under conditions that avoid condensation or addition of the resin to a thermoset condition (C-stage). If the resin is a liquid, it can be blended with thixotropic agents, other solid resins and/or liquid or thermoplastic elastomeric modifiers to convert the resin from a liquid to a processable material.

The typical thermosetting resin is an A-stage resin. In some cases, it may be desirable to utilize a B-stage resin but in the typical case, such is done in combination with an A-stage resin. Such B-stage resin will affect the viscosity of the resin formulation but they are not relied on to achieve the level of processability for the most effective operation of the invention.

A preferred class of thermosetting resin in the practice of the invention are the epoxy resins. They are frequently based, inter alia, on one or more of diglycidyl ethers of bisphenol A (2,2-bis(4-hydroxyphenyl)propane) or sym-tris(4-hydroxyphenyl)propane, tris(4-hydroxyphenyl)methane, their polyepoxide condensation products, cycloaliphatic epoxides, epoxy-modified novolacs (phenol-formaldehyde resins) and the epoxides derived from the reaction of epichlorohydrin with analine, o-, m- or p-aminophenol, and methylene dianaline.

The epoxy resins suitable in the practice of the invention include the various established thermosetting epoxy resins conventionally employed in making prepregs, especially carbon and graphite fiber reinforced prepregs. It is desirable that the epoxy resin be a low or lower viscosity version to facilitate film formation. Illustrations of suitable epoxy resins include, e.g., one or more of diglycidyl ethers of bisphenol A (2,2-bis(4-hydroxyphenyl)propane), such as those of the following formula:

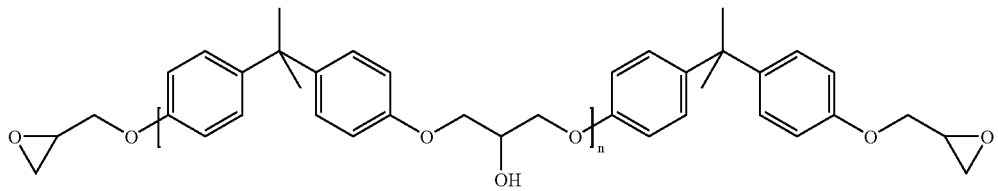

or sym-tris(4-hydroxyphenyl)propane or tris(4-hydroxyphenyl)methane, their poly-epoxide condensation products, cycloaliphatic epoxides, epoxy-modified novolacs (phenol-formaldehyde resins) of the formula:

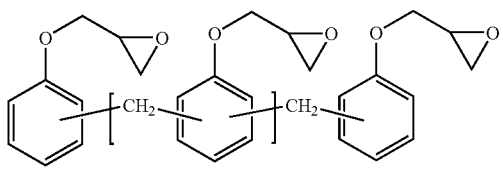

where n is 0-1.8, preferably 0.1-0.5.

Other epoxy resins may be combined with the above epoxy resins or used alone, including 3,4-epoxy cyclohexyl methyl-3,4-epoxy cyclohexane carboxylate, vinyl cyclohexene dioxide, 2-(3,4-epoxy cyclohexyl-5,5-spiro-3,4-epoxy)cyclohexane-meta-dioxane, bis(3,4-epoxy cyclohexyl) adipate, and the like.

The epoxy resins of the invention are combined with hardeners which cure the resin to a thermoset condition. The preferred hardeners are amine compounds, ranging from dicyandiamide, to ureas, to aliphatic and aromatic amines. A preferred class of hardeners are the aromatic amines encompassed by the formula:

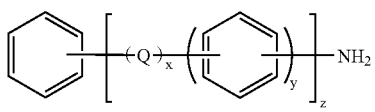

where Q is one or more of a divalent group such as —SO$_2$—, —O—, —RR'C—, —NH—, —CO—, —CONH—, —OCONH—, and the like, R and R' may each independently be one or more of hydrogen, phenyl, alkyl of 1 to about 4 carbon atoms, alkenyl of 2 to about 4 carbon atoms, fluorine, cycloalkyl of 3 to about 8 carbon atoms, and the like, x may be 0 or 1, y may be 0 or 1 and is 1 when x is 1, and z may be 0 or a positive integer, typically not greater than about 5.

Preferred hardeners are diamines of the formula:

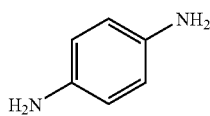

-continued

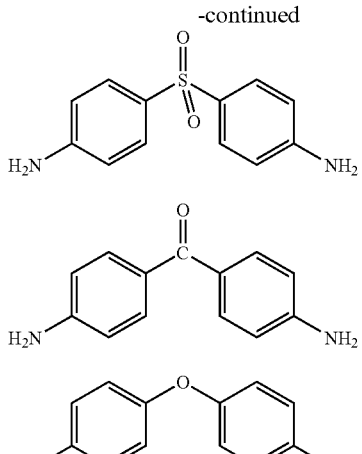

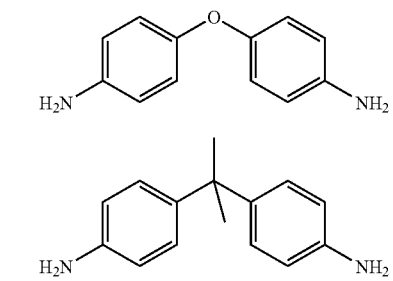

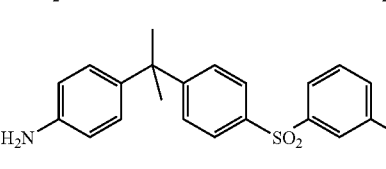

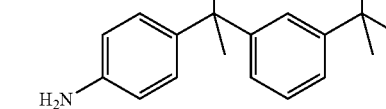

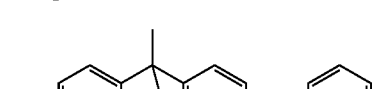

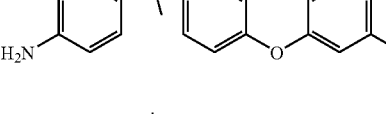

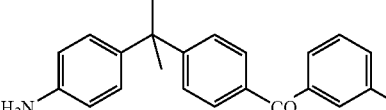

Another preferred class of hardeners are the aliphatic amines such as the alkyleneamines. Illustrative of suitable alkyleneamines include:

| | |
|---|---|
| Monoethanolamine | Ethylenediamine |
| N-(2-Aminoethyl)ethanolamine | Diethylenetriamine |
| Piperazine | N-(2-aminoethyl)piperazine |
| Triethylenetetramine | Tetraethylenepentamine |
| Pentaethylenehexamine | Diaminoethylpiperazine |
| Piperazinoethylethylenediamine | 4-Aminoethyltriethylenetetramine |
| Tetraethylenepentamine | Aminoethylpiperazinoethylethylenediamine |
| Piperazinoethyl diethylenetriamine | |

Another class of hardeners, but which can also be used as extender of the epoxy resin, are the higher molecular weight poly(oxyalkylene)polyamines such as those of the following formulas:

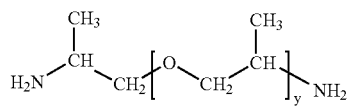

Where y is 2-40

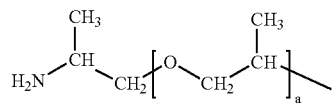

Where a + c is about 2.5 and b is 8-45

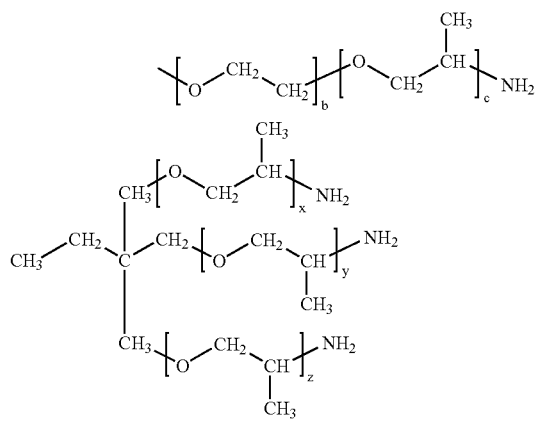

Where x, y and z range from about 2-40

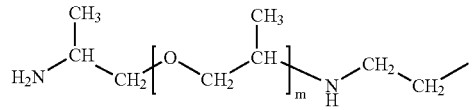

Where m + t is about 82-86

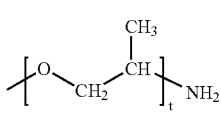

The hardener may be a monoamine such as aniline, para-aminophenol, and alkylated versions thereof.

A further class of desirable hardeners are the reaction products of dialkylamines, such as dimethylamine, diethylamine, methylethylamine, di-n-propylamine, and the like, with a variety of mono and diisocyanates to form mono and diureas. Any of the polyisocyanates listed below may be so reacted for use as a hardener. Specific illustration of useful hardeners are those encompassed by the following formulas and descriptions:

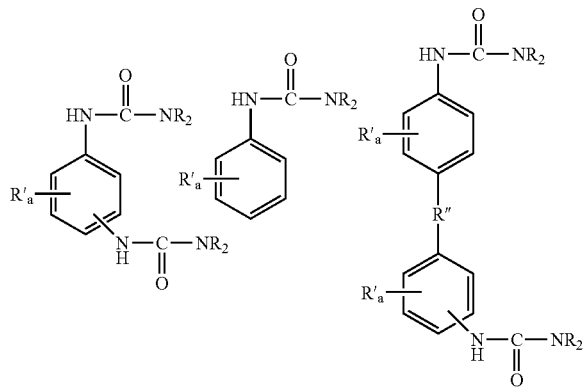

Preferred urea hardeners are those that are the reaction products of dimethylamine with mixtures of 80% 2,4-tolylene diisocyanate and 20% 2,6-tolylene diisocyanate, polymeric isocyanate, p-chlorophenylisocyanate, 3,4-dichlorophenylisocyanate or phenylisocyanate.

The amount of the hardener employed is usually stoichiometrically equivalent on the basis of one amine group per epoxy group in the resin. If the epoxide is a triepoxide and the hardener is a diamine, then the molar ratio of hardener to epoxide would typically be about 2.5/3 or 0.83. A typical formulation would have a weight ratio of epoxy resin to hardener of about 3/2 to about 4/1. Where any of the hardeners serve primarily as extenders of the epoxide resin, then the amount of the hardener in the typical case will be less than that generally employed for hardening the epoxide. Mixtures the above hardeners and with other hardeners are within the contemplation of this invention.

Other reactive resin systems include the various thermosetting or thermosettable resins include BMI, phenolic, polyester (especially the unsaturated polyester resins typically used in SMC production), PMR-15 polyimide and acetylene terminated resins are also suitable.

The urethane systems represent a typical non-engineering polymer for applications demanding less performance than, for example, the epoxy resin systems. They typically comprise the reaction of a polyisocyanate, a polyol, alone or with another active hydrogen compound, typically in the presence of a catalyst, such as an amine catalyst. However, in the practice of this invention, the polyurethane is a mixture of a blocked polyisocyanate, such as the reaction product of a mono-ol or monohydroxy phenolic compound with a polyisocyanate that is an organic polyisocyanate. This includes an organic compounds that contain at least two isocyanato groups and include the hydrocarbon diisocyanates (e.g., the alkylene diisocyanates and the arylene diisocyanates), as well as known triisocyanates and polymethylene poly(phenylene isocyanates).

The blocked isocyanates are compounds of the formula:

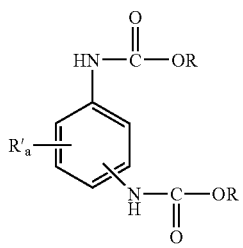

where R is a monovalent organic group; R' is alkyl, halo, alkoxy, and the like; and a is 0-4. Illustrative polyisocyanates for use in making the blocked isocyanates are:

| | |
|---|---|
| 2,4'-Diisocyanatotoluene | 2,6-Diisocyanatotoluene |
| Methylene bis (4-cyclohexyl isocyanate) | 1,2-Diisocyanatoethane |
| 1,3-Diisocyanatopropane | 1,2-Diisocyanatopropane |
| 1,4-Diisocyanatobutane | 1,5-Diisocyanatopentane |
| 1,6-Diisocyanatohexane | Bis(3-isocyanatopropyl)ether |
| Bis(3-isocyanatopropyl) sulfide | 1,7-Diisocyanatoheptane |
| 1,5-Diisocyanato-2,2-dimethylpentane | 1,6-Diisocyanato-3-methoxyhexane |
| 1,8-Diisocyanatooctane | 1,5-Diisocyanato-2,2,4-trimethypentane |
| 1,9-Diisocyanatononane | 1,10-Disocyanatopropyl)ether of 1,4-butylene glycol |
| 1,11-Diisocyanatoundecane | 1,12-Diisocyanatododecane Bis(isocyanatohexyl) sulfide |
| 1,4-Diisocyanatobenzene | 2,4-Diisocyanatotolylene |
| 2,6-Diisocyanatotolylene | 1,3-Diisocyanato-o-xylene |
| 1,3-Diisocyanato-m-xylene | 1,3-Diisocyanato-p-xylene |
| 2,4-Diisocyanato-1-chlorobenzene | 2,4-Diisocyanato-1-nitrobenzene |
| 2,5-Diisocyanato-1-nitrobenzene | 4,4-Diphenylmethylene diisocyanate |
| 3,3-Diphenyl-methylene diisocyanate | Polymethylene poly (phenyleneisocyanates) |
| Isophorone diisocyanate | |

The preferred polyisocyanates are mixture of 80% 2,4-tolylene diisocyanate and 20% 2,6-tolylene diisocyanate and polymeric isocyanate. The blocked isocyanates comprise any of the above polyisocyanates reacted with a monofunctional hydroxy containing compound. The resultant blocked polyisocyanate is unreactive towards hydroxyl compounds at room temperature but, at elevated temperatures, will function as an isocyanate to crosslink the hydroxyl compounds to form the thermoset resin. For example, an adduct of tolylene diisocyanate and trimethylolpropane is first prepared in solution, followed by the addition of phenol to block the remaining isocyanate groups. Illustrative of such a blocked polyisocyanate is a phenol blocked toluene diisocyanate in cellosolve acetate sold by Mobay Chemical Co., under the trade designation MONDUR S. Such blocked isocyanates, when mixed with the polyols, provide a thermosetting polyurethane matrix resin that can form a tacky in situ-expandable film that is storable and curable on demand, in accordance with the invention.

The polyols used in forming the polyurethane may be an organic diol, triol, tetraol, pentaol, and the like. Illustrative are the following compounds: ethylene glycol, diethylene glycol, triethylene glycol, tetraethylene glycol, 1,2-propylene glycol, di-1,2-propylene glycol, tri-1,2-propylene glycol, tetra-1,2-propylene glycol, 1,4-butanediol, 1,3-propanediol, and the like; or formed from by the alkoxylation of a starter polyol, such as the class of polyols characterized; or formed from reaction of the above diols, triols, etc., With caprolactone. The resulting ester polyols ("Tone's") are widely used in reactions with isocyanate. Desirable alkoxylated polyols are alkylene oxide adducts of a hydroxylated alcohols of the formula:

$$A(OH)_{>1}$$

And preferably a "starter" diol, triol, tetraol and higher hydroxylated alcohols, of the formula:

$$A(OH)\neg_{2-6}$$

where A is a polyvalent organic moiety, the free valence of which is 2-6 or greater, or an average value equal thereto, as the case may be.

Illustrative of suitable compounds embraced by the "starter" $A(OH)\neg_{2-6}$ alcohol are the following: ethylene glycol, diethylene glycol, 1,2-propylene glycol, polyethylene glycol, polypropylene glycol, glycerine, pentaerythritol, sorbitol, diether of sorbitol, mannitol, diether of mannitol, arabitol, diether or arabitol, sucrose, mixtures thereof, and the like.

The starter $A(OH)\neg_{2-6}$ is first reacted with 1,2-alkylene oxide in an amount and under conditions sufficient to convert its hydroxyl groups to hydroxyalkyl groups. The amount of 1,2-alkylene oxide reacted is sufficient to achieve the ultimate molecular weight of the alkoxylated polyol adduct. The molecular weight of the alkoxylated polyol adduct should be relatively high, preferably above about 4000 (number average) and, more preferably, above about 5000. The minimum molecular weight of the alkoxylated polyol adduct may be about 2000. The preferred 1,2-alkylene oxides are lower 1,2-alkylene oxides, such as ethylene oxide, 1,2-propylene oxide, 1,2-butylene oxide, and the like. The resulting polyol may be hydroxyethyl capped by reaction with 1,2-ethylene oxide to provide assurance of primary hydroxyl content in the polyol especially if the alkoxylated polyol adduct is subsequently coupled, not polymerized, with an organic polyisocyanate. Such alkoxylation reactions, with consequent adduct formation, is well known in the art. Adduct reactions may be base or acid catalyzed, with base catalyzation preferred.

The organic polyol may be a polyester polyol, such as a polyester of a dicarboxylic acid, acid halide or anhydride and a polyol, such as those characterized above. In this case, it is desirable to allow the polymer to be hydroxyl terminated, and conventional procedures in the art are useful for this purpose. A polyol is also employed to produce the polyester. Such polyols include ethylene glycol, diethylene glycol, propylene glycol, dipropylene glycol, butylene glycols, neopentyl glycol, glycerol and 1,1,1-trimethylolpropane.

Polyester resins usable as the thermosetting matrix resin, are typically reaction products of a dicarboxylic acid, acid halide or anhydride, with a polyhydric alcohol. The dicarboxylic acids or anhydrides that are employed to produce the polyester, either singly or in combination, include those that contain olefinic unsaturation, preferably wherein the olefinic unsaturation is alpha, beta- to at least one of the carboxylic acid groups, saturated aliphatic, heteroaliphatic and aromatic polycarboxylic acids, and the like. Such acids include maleic acid or anhydride, fumaric acid, methyl maleic acid, and itaconic acid (maleic acid or anhydride and fumaric acid are the most widely used commercially), saturated and/or aromatic dicarboxylic acids or anhydrides such as phthalic acid or anhydride, terephthalic acid, hexahydrophthalic acid or anhydride, adipic acid, isophthalic acid, and "dimer" acid (i.e., dimerized fatty acids). They may be cured by providing a polymerization initiator and low viscosity crosslinking monomers in the formulation. Where the resin is a unsaturated polyester or vinyl ester, it is preferred that the monomers contain ethylenic unsaturation such that the monomer is copolymerizable with the polyester and terminally unsaturated vinyl ester resins. Useful monomers include monostyrene, alkyl acrylates and methacrylates such as $C_{1-12}$ alkyl acrylates and methacrylates, substituted styrenes such as α-methyl styrene, α-chlorostyrene, 4-methylstyrene, and the like, divinylbenzene, acrylonitrile, methacrylonitrile, and the like. Styrene is the preferred monomer in commercial practice today, although others can be used. Suitable polymerization initiators include t-butyl hydroperoxide, t-butyl perbenzoate, benzoyl peroxide, cumene hydroperoxide, methyl ethyl ketone peroxide, and others known to the art. The polymerization initiator is employed in a catalytically effective amount, such as from about 0.3 to about 2 to 3 weight percent, based on the weight of polyester and the crosslinking monomer.

Another preferred class of thermosetting resins are benzoxazines. The benzoxazine component may typically be prepared by reacting a phenolic compound, such as a bisphenol A, bisphenol F, bisphenol S or thiodiphenol, with an aldehyde and an amine. U.S. Pat. No. 5,543,516, hereby expressly incorporated herein by reference, describes a method of forming benzoxazines, where the reaction time can vary from a few minutes to a few hours, depending on reactant concentration, reactivity and temperature. See also Burke et al., *J. Org. Chem.*, 30(10), 3423 (1965); see generally U.S. Pat. Nos. 4,607,091 (Schreiber), 5,021,484 (Schreiber), 5,200,452 (Schreiber) and 5,443,911 (Schreiber).

Benzoxazines are presently available from several sources commercially, including Vantico, Inc., Brewster, N.Y., Georgia-Pacific Resins, Inc. And Shikoku Chemicals Corporation, Chiba, Japan, the last of which offers among others B-a, B-m, F-a, C-a and F-a benzoxazine resins. Of these, the benzoxazine component is oftentimes desirably within the B-m benzoxazine resin family.

The benzoxazine of the heat curable composition may be embraced by the following structure:

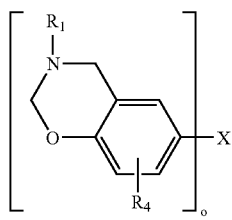

where o is 1-4, X is selected from a direct bond (when o is 2), alkyl (when o is 1), alkylene (when o is 2-4), carbonyl (when o is 2), thiol (when o is 1), thioether (when o is 2), sulfoxide (when o is 2), and sulfone (when o is 2), $R_1$ is selected from hydrogen, alkyl and aryl, and $R_4$ is selected from hydrogen, halogen and alkyl.

More specifically, the benzoxazine may be embraced by the following structure:

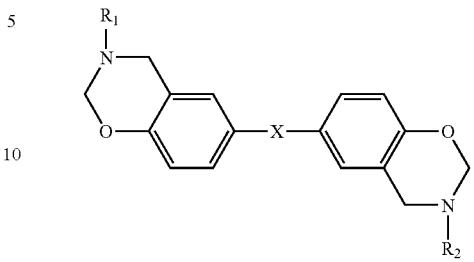

where X is selected from of a direct bond, $CH_2$, $C(CH_3)_2$, C=O, S, S=O and O=S=O, and $R_1$ and $R_2$ are the same or different and are selected from hydrogen, alkyl, such as methyl, ethyl, propyls and butyls, and aryl.

Representative benzoxazines include:

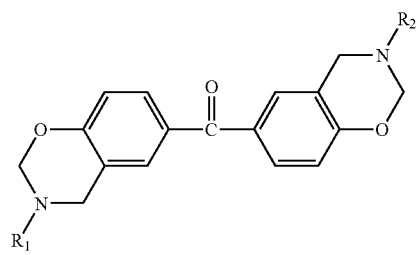

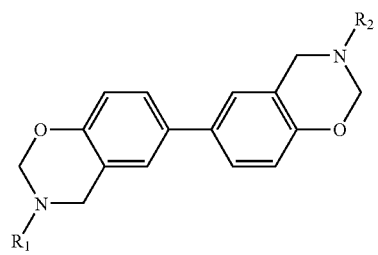

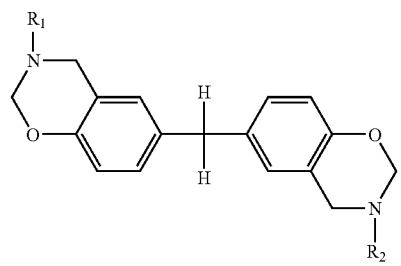

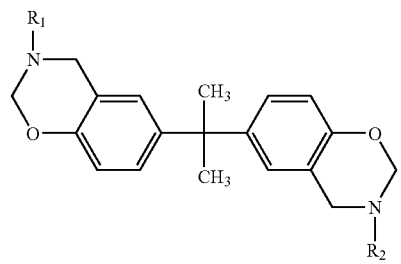

where $R_1$ and $R_2$ are as defined above.

Alternatively, the benzoxazine may be embraced by the following structure:

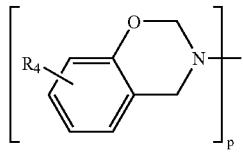

where p is 2, Y is selected from the group consisting of biphenyl (when p is 2), diphenyl methane (when p is 2), diphenyl isopropane (when p is 2), diphenyl sulfide (when p is 2), diphenyl sulfoxide (when p is 2), diphenyl sulfone (when p is 2), and diphenyl ketone (when p is 2), and $R_4$ is selected from hydrogen, halogen and alkyl.

Though not embraced by the above structures, additional benzoxazines are within the following structures:

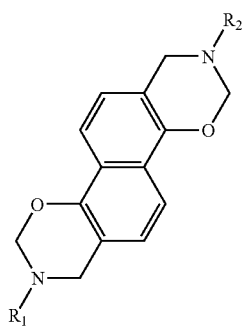

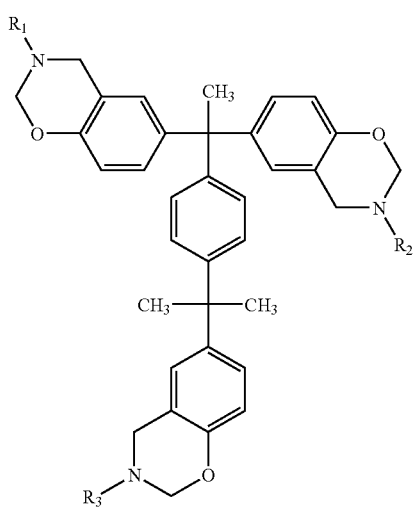

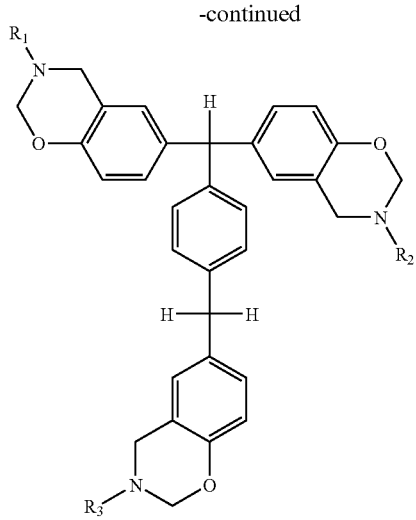

where $R_1$ are $R_2$ are as defined above, and $R_3$ is defined as $R_1$ or $R_2$.

Examples of these benzoxazines therefore include:

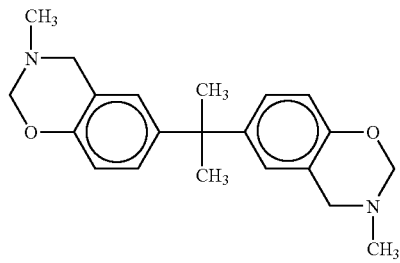

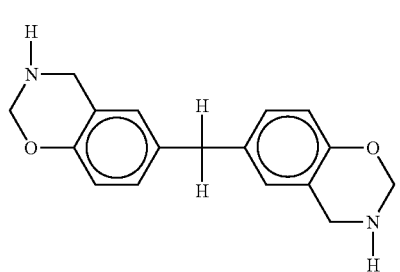

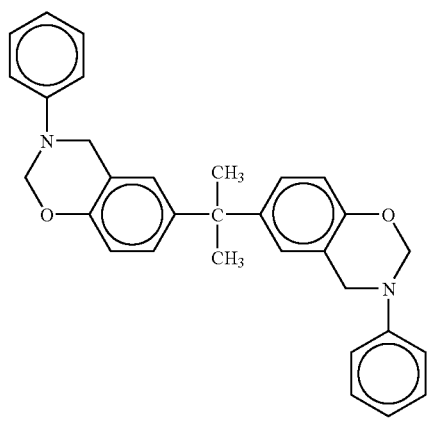

-continued

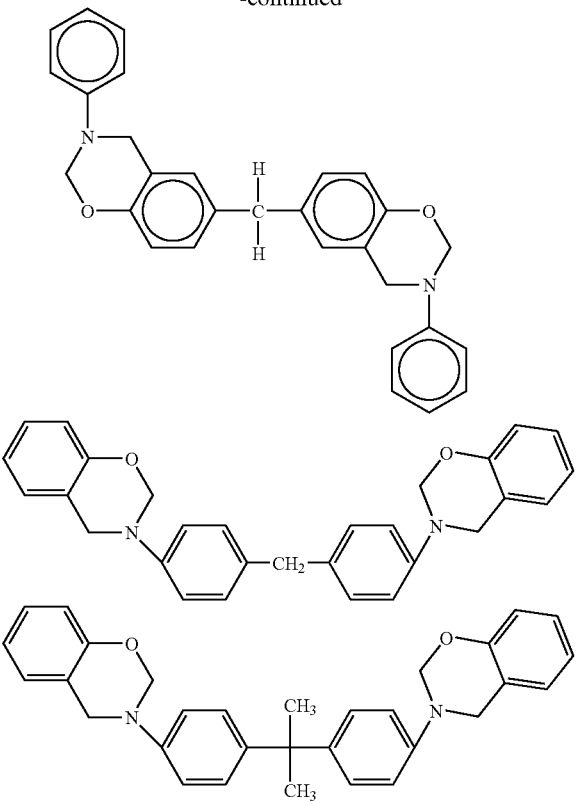

The benzoxazine component may include the combination of multifunctional benzoxazines and monofunctional benzoxazines.

Examples of monofunctional benzoxazines may be embraced by the following structure:

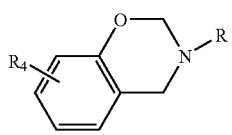

where R is alkyl, such as methyl, ethyl, propyls and butyls, or aryl, and $R_4$ is selected from hydrogen, halogen and alkyl.

The benzoxazine component should be present in an amount in the range of about 10 to about 99 percent by weight, such as about 25 to about 75 percent by weight, desirably about 35 to about 65 percent by weight, based on the total weight of the composition.

Thus, the benzoxazine component may include multifunctional benzoxazines, monofunctional benzoxazines, and combinations thereof.

Benzoxazine polymerization can also be initiated by cationic initiators, such as Lewis acids, and other known cationic initiators, such as metal halides; organometallic derivatives; metallophorphyrin compounds such as aluminum phthalocyanine chloride; methyl tosylate, methyl triflate, and triflic acid; and oxyhalides.

The benzoxazine may be used as the sole reactive component of the thermosetting resin. Though the benzoxazine may also be used in combination.

In one version, therefore, the benzoxazine component may also include a toughener component comprising acrylonitrile-butadiene co-polymer having secondary amine terminal groups.

This toughener component should be present in an amount in the range of about 1 to about 90 percent by weight, such as about 10 to about 70 percent by weight, desirably about 15 to about 30 percent by weight, based on the total weight of the composition.

In another version, the benzoxazine component may also include (ii) an epoxy or episulfide component;

(iii) optionally, one or more of an oxazoline component, a cyanate ester component, a phenolic component, and a thiophenolic component;

(iv) optionally, a toughener, such as one or more of an acrylonitrile-butadiene co-polymer, a polyimide component, and a polyimide/siloxane component, and those referred to below; and (v) optionally, a curative, as noted above.

The epoxy or episulfide component should be present in an amount in the range of about 5 to about 60 percent by weight, such as about 10 to about 50 percent by weight, desirably about 15 to about 35 percent by weight, based on the total weight of the composition.

When present, the oxazoline component, the cyanate ester component, the phenolic component, and the thiophenolic component should be present in an amount in the range of about 5 to about 60 percent by weight, such as about 10 to about 50 percent by weight, desirably about 15 to about 35 percent by weight, based on the total weight of the composition.

When present, the acrylonitrile-butadiene co-polymer, polyimide component, and the polyimide/siloxane component should be present in an amount in the range of about 1 to about 50 percent by weight, such as about 5 to about 35 percent by weight, desirably about 10 to about 25 percent by weight, based on the total weight of the composition.

The curative should be present in an amount in the range of about 0.01 to about 40 percent by weight, such as about 0.5 to about 20 percent by weight, desirably about 1 to about 15. percent by weight, based on the total weight of the composition.

When desired, a thickening agent can also be employed in the polyester thermosetting compositions. Such materials are known in the art, and include the oxides and hydroxides of the metals of Group I, II and III of the Periodic Table. Illustrative examples of thickening agents include magnesium oxide, calcium oxide, calcium hydroxide, zinc oxide, barium oxide, magnesium hydroxide and the like, including mixtures of the same. Thickening agents are normally employed in proportions of from about 0.1 to about 6 weight percent, based upon the total weight of the matrix resin.

Particularly desirable materials for rendering the thermosetting resin processable are thixotropic agents and/or tougheners (as noted above), such as elastomer-type polymers, that provide discrete elastomer phases (second phases) in the thermosetting resin matrix. Certain of these material may reduce, to some finite degree, the crosslinking density of the thermoset resin (C-stage). Many of these materials introduce very favorable properties to the resulting thermoset resin. For example, a particularly desirable material for this purpose, is an elastomeric polymer containing soft and hard segments, the hard segments acting like or forming on processing, crosslinking of the elastomeric type. Some of these elastomeric types contain functional end groups which allow it to couple with complementary functional monomers or polymers to form the desired elastomer in situ of the thermosetting resin and render it processable, while toughening the cured resin. As a class, these elastomeric polymers act or are crosslinked yet are thermoprocessable, which when discretely provided in the matrix resin renders the resin processable, and also toughens it.

One class of suitable elastomer-type thermoplastic tougheners are acrylonitrile-1,4-butadiene-styrene block copolymers ("ABS") that are typically used as modifiers of other resin systems. They are characterized as having a wide range of properties though the preferred systems of the invention utilize copolymers that are high rubber types that, when compared to other copolymers of this type, have a relatively low tensile strength, low tensile modulus, higher impact resistance, low hardness and heat deflection temperature. Another elastomer that is found desirable are the carboxyl and amine terminated liquid butadiene acrylonitrile copolymers. Such copolymers may contain pendant carboxyl groups in the interior of the polymer structure through the inclusion of (meth) acrylic acid in the polymerization or through the hydrolysis of some of the pendant nitrile units. Such polymers react with the epoxy resin and as a result, the epoxy forms the hard segment generating the elastomer properties.

Another class of block thermoplastic elastomers are available commercially under the trade name KRATON™, from Shell Chemical Company. These thermoplastic rubber polymers possess usable thermoplastic properties. They can be softened and they flow under heat and pressure. They then recover their structures on cooling. The chemical make-up are of three discrete blocks of the linear or A-B-A type. They are available as styrene-butadiene-styrene (S-B-S) block copolymers, styrene-isoprene-styrene (S-B-S) block copolymers and styrene-ethylene/butylene-styrene (S-EB-S) block copolymers. They are characterized by styrene polymer endblocks and an elastomeric midblock. After processing, the polystyrene endblocks physically crosslink, locking the rubber network in place. This physical crosslinking is reversible on heating.

Another series of the KRATON™ thermoplastic rubbers are the diblock polymers in which one block is a hard thermoplastic and the other is a saturated soft elastomer. Illustrative of this series is KRATON™ G 1701, a diblock polymer of a hard polystyrene block and a saturated, soft poly(ethylene-propylene) block.

Other rubbers or elastomers include: (a) homopolymers or copolymers of conjugated dienes having a weight average molecular weight of 30,000 to 400,000 or higher as described in U.S. Pat. No. 4,020,036, in which the conjugated dienes contain from 4-12 carbon atoms per molecule such as 1,3-butadiene, isoprene, and the like; (b) epihalohydrin homopolymers, a copolymer of two or more epihalohydrin monomer, or a copolymer of an epihalohydrin monomer(s) with an oxide monomer(s) having a number average molecular weight ($M_n$) which varies from about 800 to about 50,000, as described in U.S. Pat. No. 4,101,604; (c) chloroprene polymers including homopolymers of chloroprene and copolymers of chloroprene with sulfur and/or with at least one copolymerizable organic monomer wherein chloroprene constitutes at least 50 weight percent of the organic monomer make-up of the copolymer as described in U.S. Pat. No. 4,161,471; (d) hydrocarbon polymers including ethylene/propylene dipolymers and copolymers of ethylene/propylene and at least one nonconjugated diene, such as ethylene/propylene/hexadiene/norbornadiene, as described in U.S. Pat. No. 4,161,471; and (e) conjugated diene butyl elastomers, such as copolymers consisting of from 85 to 99.5% by weight of a $C_4$-$C_7$ isolefin combined with 15 to 0.5% by weight of a conjugated multi-olefin having 4 to 14 carbon atoms, copolymers of isobutylene and isoprene where a major portion of the isoprene units combined therein have conjugated diene unsaturation as described in U.S. Pat. No. 4,160,759.

Specific illustrations of elastomeric polymers suitable as tougheners include HYCAR™ CTBN liquid reactive rubbers, carboxyl-terminated butadiene-acrylonitrile copolymers supplied by Noveon; HYCAR™ CTBNX, similar to CTBN except that they contain internal pendant carboxyl groups, also supplied by Noveon; HYCAR™ ATBN, amine-terminated butadiene-acrylonitrile copolymers, supplied by Noveon; K 1102-28:72 styrene:butadiene linear SBS polymer, available from Shell Chemical Company under the trademark KRATON® 1102; KDX 1118-30:70 styrene:butadiene copolymer containing 20% SBS triblock and 80% SB diblock, available from Shell Chemical Company under the trademark KRATON® DX 1118; KG 1657-14:86 stryene:ethylene-butylene:styrene copolymer available from Shell Chemical Company under the trademark KRATON® G1657; S 840 A-Stereospecific 43:57 styrene-butadiene SB rubber available from Firestone Synthetic Rubber & Latex Company under the trademark STEREON 840A; SBR 1006-random 23.5:76.5 styrene:butadiene SB block copolymer rubber available from Goodrich Chemical Company under the trademark AMERIPOL 1006; SBR 1502-Random 23.5:77.5 styrene:butadiene rubber available from Hules Mexicanos, or from Goodrich Rubber Company as AMERIPOL 1502; and CYCOLAC™ Blendex modifier resins (e.g., 305, 310, 336 and 405)—ABS polymers supplied by Borg-Warner Chemicals, Inc. Different varieties are available and their suitability depends on the properties sought.

Illustrative of thixotropic agents that can render a matrix resin processable are high surface area fumed silicas and organosilyl blocked fumed silicas, various microspheres, and the like. The most common of the microspheres are made of glass, but quartz, phenolic, carbon, thermoplastic and metal-coated microspheres are usable. The microspheres in those syntactic foam plugs are synthetic hollow microspheres that comprise individual round spheres or bubbles having diameters which range from about 1 to about 500 microns, preferably about 1 to about 200 microns, with wall thicknesses of about 0.1 to about 20 microns. They typically possess densities ranging from about 0.1 to about 0.5 g./cc. The syntactic foam comprising the rigid microspheres in a resin matrix as a result have relatively low densities such as densities ranging from about 0.5 to about 0.7 g./cm$^3$. Glass is the most common microsphere material in these types of materials, but quartz, phenolic, carbon, thermoplastic and metal-coated microspheres are suitably employable.

The thermoplastic polymer used in forming the in situ-expandable thermoplastic particles is readily prepared from a wide choice of materials. A number of U.S. patents refer to their manufacture. For example, U.S. Pat. No. 3,615,972 describes their preparation by polymerizing the monomer of an aqueous dispersion of (1) organic monomeric materials suitable for polymerization to a thermoplastic resinous material having the desired physical properties, (2) a liquid blowing or raising agent which exerts a little solvent action on the resulting polymer, and in a quantity in excess of that which is soluble in the polymer, and (3) a dispersion stabilizing material which is utilized to maintain the dispersion. The resulting solid spherical particles have a quantity of the liquid-blowing agent encapsulated in them as a distinct and separate phase.

The thermoplastic polymers are formed by the polymerization of one or more of a variety of different types of alkenyl monomers, such as those of the formula:

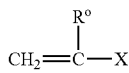

To form homopolymers or copolymers, such as random or ordered (including block) copolymers. In the above formula, $R^\circ$ may be hydrogen, alkyl, such as methyl, ethyl and the like, or halogen, such as chlorine, fluorine, bromine or iodine, and X may be an aromatic containing moiety bonded via an aromatic carbon atom, a carbonyl oxy ester moiety, halogen, cyano, oxycarbonyl ester, carboxyl, and the like. Illustrative of these monomers are those in which X is aromatic containing, such as styrene, o-methylstyrene, m-methylstyrene, p-methylstyrene, ethylstyrene, ar-vinyl-xylene, ar-chlorostyrene, ar-bromostyrene, vinylbenzylchloride, p-t-butylstyrene, and the like. Also illustrative of these monomers are those in which X is a carbonyl oxy ester moiety to form (meth)acrylate monomers alone or in combination with the alkenyl aromatic monomers may also be utilized. Such (meth)acrylate-type monomers include methyl methacrylate, ethyl acrylate, propyl acrylate, butyl acrylate, butyl methacrylate, propyl methacrylate, butyl methacrylate, lauryl acrylate, 2-ethyl hexyl acrylate, ethyl methacrylate, and the like. X and $R^\circ$ may be a halogen, such as chlorine, fluorine, bromine and iodine, thereby to encompass the formation of copolymers of vinyl chloride and vinylidene chloride, acrylonitrile with vinyl chloride, vinyl bromide, and similar halogenated vinyl compounds. X may be a cyano group and this includes polymers of acrylonitrile and methacrylonitrile. When X is an oxycarbonyl esters, such as the vinyl esters, such as, vinyl acetate, vinyl butyrate, vinyl stearate, vinyl laurate, vinyl myristate, vinyl propionate, and the like, are suitable polymeric components. One may also employ for specific purposes ethylenically unsaturated copolymerizable acids such as acrylic acid, methacrylic acid, itaconic acid, citraconic acid, maleic acid, fumaric acid, vinylbenzoic acid, and the like.

The thermoplastic polymers may also include copolymers (of the random or ordered varieties, especially blocked copolymers) of the monomers described above with a variety of hydrocarbon monomers, such as propylene, butene, and one or more dienes, such as: straight chain acyclic dienes such as 1,4-hexadiene, 1,6-octadiene, and the like; branched chain acyclic dienes such as 5-methyl-1,4-hexadiene, 3,7-dimethyl-1,6-octadiene, 3,7-dimethyl-1,7-octadiene and the mixed isomers of dihydromyrcene, dihydroocinene, and the like; single ring alicyclic dienes such as 1,4-cyclohexadiene, 1,5-cyclooctadiene, 1,5-cyclododecadiene, and the like; multi-ring alicyclic fused and bridged ring dienes such as: tetrahydroindene, methyltetrahydroindene, dicyclopentadiene, bicyclo-(2,2,1)-hepta-2,5-diene, alkenyl, alkylidene, cycloalkenyl and cycloalkylidene norbornenes such as 5-methylene-2-norbornene ("MNB"), 5-ethylidene-2-norbornene ("ENB"), 5-propyl-2-norbornene, 5-isopropylidene-2-norbornene, 5-(4-cyclopentenyl)-2-norbornene, 5-cyclohexylidene-2-norbornene, and the like.

The thermoplastic polymer used in forming the in situ-expandable thermoplastic particles may also be made from condensation type polymers, such as nylon-6,6; nylon-6; nylon-4,6; polyester from polyethylene terephthalate; KEVLAR® polyaramide; polycarbonates (viz., poly (2,2-bis(1.4-oxyphenyl) propane carbonate)); polyarylates (viz., poly (2,2-bis(1.4-oxyphenyl) propane terephthalate); polyimides; polyetherimides, such as ULTEM®[3]; polysulfones (see U.S. Pat. Nos. 4,175,175 and 4,108,837), such as UDEL® and RADEL® A-400[4]; the polyethersulfones (see U.S. Pat. Nos. 4,008,203, 4,175,175 and 4,108,837), such as VICTREX™ PES; polyarylsulfones; polyarylamideimides, such as TORLON®[5]; and the like.

[3] General Electric Plastics
[4] BP Amoco.
[5] BP Amoco.

A wide variety of blowing or raising agents may be incorporated within the polymerization system. They can be volatile fluid-forming agents such as aliphatic hydrocarbons including ethane, ethylene, propane, propylene, butene, isobutylene, neopentane, acetylene, hexane, heptane, or mixtures of one or more such aliphatic hydrocarbons having a molecular weight of a least 26 and a boiling point below the range of the softening point of the resinous material when saturated with the particular blowing agent utilized.

Other suitable fluid-forming agents are the chlorofluorocarbons such as those described in U.S. Pat. No. 3,615,972 (column 4, lines 21-30) and tetraalkyl silanes such as tetramethyl silane, trimethylethyl silane, trimethylisopropyl silane and trimethyl-n-propyl silane. As pointed out in this patent, the boiling point of such foaming agents at atmospheric pressure should be about the same temperature range or lower than the softening point of the resinous material employed.

As pointed out in U.S. Pat. No. 4,397,799, the particle size of the unexpanded particles, as well as the expanded microspheres can vary widely. Particle sizes for the unexpanded particles can range, for example, from about 1 μm to about 1 mm, preferably from about 2 μm to about 0.5 mm. One version of in situ-expandable particles are available under the tradename EXPANCEL®, by Casco Products, (http://www.expancel.com/) a business unit of Akzo Nobel, a Dutch company, (http://www.akzonobel.com/company/) located in Sundsvall, Sweden (with a subsidiary in Duluth, Ga.). EXPANCEL® microspheres are small spherical plastic particles that consist of a polymer shell encapsulating a gas. EXPANCEL® microspheres range in unexpanded particle size from about 5 μm to about 50 μm. When the gas inside the shell is heated, it increases its pressure and the thermoplastic shell softens, resulting in an increase in the volume of the microspheres. The particle diameters expand 2 to 5 times. In some instances, when fully expanded, the volume of the microspheres may increase more than 40 times. "The—expansion when heated and the other—properties of EXPANCEL® microspheres are due to a small amount of a hydrocarbon encapsulated by a gas tight thermoplastic shell. When the microspheres are heated the thermoplastic shell softens and the hydrocarbon inside the shell increases its pressure. This results in a[n]—expansion of the spheres (typical diameter values: from 10 to 40 μm), with a corresponding—decrease of the density (typical values: from 1000 to 30 g/liter). The different EXPANCEL® microsphere grades vary according to expansion factor, heat resistance, particle size and chemical and solvent resistance."

There are grades of EXPANCEL® microspheres available with expansion temperatures in the range of 80-190° C. (176-374° F.). The temperature at which expansion starts as well as the temperature at which the maximum expansion and the lowest density is obtained depends to some degree on the heating rate. At temperatures above the temperature at which the highest expansion is obtained the microspheres gradually collapse.

The unexpanded versions of EXPANCEL® microspheres include EXPANCEL® WU, representing wet unexpanded microspheres, EXPANCEL® DU, representing dry unexpanded microspheres, EXPANCEL® slurry representing a dispersion of unexpanded microspheres, and EXPANCEL® MB representing a master batch of unexpanded microspheres in a matrix. Preferred EXPANCEL® micropheres are the DU variety described in the following table.

| EXPANCEL® GRADE | Particle Size/mm (Wt. Avg. Diam.)[1] | Thermomechanical Analysis[2] | | TMA-density Kg/m³ | Solvent Resistance[3] |
|---|---|---|---|---|---|
| | | $T_{start}$/° C. | $T_{max}$/° C. | | |
| 820 | 10-16 | 75-80 | 115-125 | <25 | * |
| 642 | 10-16 | 84-90 | 125-133 | <17 | ** |
| 551 | 10-16 | 93-98 | 135-143 | <17 | *** |
| 551-20 | 6-9 | 93-98 | 129-137 | <25 | *** |
| 551-80 | 18-24 | 93-98 | 138-148 | <20 | *** |
| 461 | 9-15 | 96-102 | 137-145 | <20 | **** |
| 461-20 | 6-9 | 98-104 | 133-141 | <30 | **** |
| 051 | 9-15 | 106-111 | 138-147 | <25 | **** |
| 007 | 10-16 | 90-98 | 132-140 | <15 | *** |
| 053 | 10-16 | 94-101 | 136-144 | <20 | *** |
| 054 | 10-16 | 118-128 | 140-150 | <17 | *** |
| 091 | 10-16 | 120-128 | 161-171 | <17 | ***** |
| 091-80 | 18-24 | 116-124 | 171-181 | <17 | ***** |
| 091-140 | 35-45 | 112-122 | 183-193 | <14 | ***** |
| 092-120 | 28-38 | 116-126 | 188-198 | <14 | ***** |
| 093-120 | 28-38 | 116-126 | 182-196 | <14 | ***** |

[1] EXPANCEL Technical Bulletin No. 3
[2] EXPANCEL Technical Bulletin No. 5
[3] EXPANCEL Technical Bulletin No. 7

Preferably, the particles used have a mixed particle size of wide spread to achieve the best packing, on expansion, in the syntactic molded foam. A particularly preferred in situ-expandable particle are the closed-cell generating EXPANCEL® microspheres 092 DU 120, 091 DU, 091 DU 80, 091 DU 140, 093 DU 120, which are believed to be terpolymers of vinylidene chloride, acrylonitrile and methacrylonitrile containing 10-18 weight % isopentane, and possessing the properties set forth in the foregoing table. EXPANCEL® 092 DU 120 is the most preferred of this type of in situ-expandable particle.

Blowing agents such as the FREON® blowing agents (trichlorofluoromethane, hydrocarbons such as n-pentane, i-pentane, neo-pentane, butane, i-butane, and azodicarbonamide) are commonly suggested blowing agents found in these types of in situ-expandable particles. Typically, the unexpanded particles contain from about 3 to about 40 percent by weight blowing agent.

As noted above, the matrix resin/particle mixture may contain fibers. Such fibers provide toughness properties to the resulting molded syntactic foam product. Fibers that may be used in the practice of the invention may be any organic and inorganic fiber that has a melting temperature ($T_m$) greater than the cure temperature of the matrix resin in making the expanded molded syntactic foam. Also usable in the practice of this invention are fibrous type of structures, having a length greater than diameter, that are made of amorphous polymers. For example, certain polysulfone fibers having a high $T_g$ may be employed. In such a case, the $T_g$ of the polymer should be greater than the cure temperature of the matrix resin. Suitable fibers may be made from any of the performance and engineering plastics or glass fibers, graphite fibers, carbon fibers, asbestos fibers, and the like. For example, the fibers may be made from nylon-6,6; nylon-6; nylon-4,6; polyester from polyethylene terephthalate; polypropylene; cellulose acetates, rayons, KEVLAR® polyaramide; polycarbonates (viz., poly (2,2-bis (1.4-oxyphenyl) propane carbonate)); polyarylates (viz., poly (2,2-bis(1.4-oxyphenyl) propane terephthalate); polysulfides (see U.S. Pat. No. 3,862,095); polyimides; polyetherimides, such as ULTEM®[6]; polyetheretherketones, such as VICTREX® PEEK[7] and polyetherketoneketone or polyetherketoneketone, such as Stilan® PEK or PEKK[8]; polysulfones (see U.S. Pat. Nos. 4,175,175 and 4,108,837), such as UDEL® and RADEL® A-400[9]; the polyethersulfones (see U.S. Pat. Nos. 4,008,203, 4,175,175 and 4,108,837), such as VICTREX® PES; polyarylsulfones; polyarylamideimides, such as TORLON®[10]; and the like.

[6] General Electric Plastics
[7] Victrex plc <www.ampersandesign.net/victrex/main.html>
[8] Raychem Corporation
[9] BP Amoco and Boedeker Plastics, Inc. Rt. 2•Box 5•904 West 6th St., Shiner, Tex. 77984
[10] BP Amoco The preferred fibers are the glass fibers, graphite fibers, carbon fibers, asbestos fibers, and those made from the engineering plastics, such as the polyarylethers which include the polyetherimides, the polyetheretherketones, the polyetherketones, the polyetherketoneketone, the polysulfones, the polyethersulfones, the polyarylsulfones, the polyarylamideimides, and the like. Particularly preferred fibers are the glass fibers, graphite fibers, carbon fibers, asbestos fibers, and those made from polyetheretherketones, polyetherimides, polyarylamides, polyarylamideimides, polysulfones, polyethersulfones and polycarbonates.

As indicated previously, there are two ways in which fibers can be incorporated into the plugs of the invention. The fibers can be uniformly distributed throughout the plug as cut or staple fibers or the fibers can be in the form of spun yarn or filaments (continuous filaments or spun twisted yarn) and strategically located within the plug.

The staple or cut fibers are typically in the form of short cut fibers, i.e., staple fibers, ranging from about 2.5 millimeters to about 13 millimeters. Longer fibers may be used and when they are used, they typically concentrate at or near the surfaces of the syntactic foam, as a result of migration during expansion. The diameter of the fibers may range considerably. Preferably, the fiber diameter ranges from about 20 μm to about 70 μm, preferably from about 30 μm to about 60 μm. The spun yarn or filaments are placed within the casted or pultrusion extruded plug components, as illustrated in the drawings and described above.

Coupling agents may be used in formulations where bonding between fibrous and filler components of the formulation can be enhanced. Suitable coupling agents are the organofunctional silane and silicone coupling agents, where the organofunctionality includes amino groups (e.g., gamma-aminopropyltriethoxy silane, beta-aminoethyl-gamma-aminopropyl triethoxy silane, and the like), epoxy groups (e.g., glycidyloxypropyl trimethoxy silane, epoxycyclohexyl trimethoxy silane, and the like), and acrylic groups (e.g., gamma-methacrylyloxypropyl trimethoxysilane). They can be coated on the fibrous and filler components and/or added directly into the resin formulation and effect in situ coupling.

A typical resin formulation comprises the following:

| Formulation | Range Percent By Weight | Preferred Range Percent By Weight |
|---|---|---|
| Bisphenol A epoxy resin. A preferred resin comprises a mixture of (a) a solid resin and a liquid resin that yield a | 40 to 80 | 60 to 75 |

-continued

| Formulation | Range Percent By Weight | Preferred Range Percent By Weight |
|---|---|---|
| processable, resin; or (b) a mixture of liquid resins that yield a processable resin; or (c) a mixture of a liquid Bisphenol A epoxy resin and low molecular weight novolak epoxy resin. | | |
| Incompatible in situ isotropically expandable thermoplastic particles containing expansion agent therein | 5 to 45 | 6 to 15 |
| A toughening agent. A desirable toughening agent may be a carboxylated butadiene acrylonitrile copolymer elastomer; an ABS block copolymer elastomer; and SBS block copolymer elastomer. | 0 to 12 | 0 to 9 |
| Hydroxyl extender for the epoxy resin(s). The preferred extender is bisphenol A. | 0 to 20 | 4 to 12 |
| Amine curing agent. Preferred amine curing agents include aliphatic amines, alkylene oxide amines, aromatic amines and aromatic ureas. | 4 to 12 | 5 to 10 |
| Fibers | 0 to 20 | 6 to 14 |
| Glass microspheres | 0 to 10 | 2 to 6 |

These resin formulations are made by conventional mixing of the components in standard mixing equipment for viscous compositions. Good results have been obtained using a ROSS® Double Planetary Mixer, provided with vacuum construction and jacketing to control temperature and deaerate the mixture. Mixing is typically effected by blending the resin, unexpanded particles, elastomer components, extenders, diluents, curing agent and fibers (these being added last), and vacuum pumping to remove entrained air. The temperature chosen is variable depending on the viscosity of the formulation. It may be desirable to separately mix the resin and the curing agent. In such a case, the formulation may be divided up to mix the resin with some portion of the formulation to effect a well dispersed condition and do the same with the curing agent, and then combine the well dispersed mixes with the fiber component and the unexpanded particles, so as to mix them all under conditions avoiding premature reaction. Such procedures are well within the skill of the art.

A laboratory extrusion system for making the matrix resin/particle mixture of the invention that can be extruded, pultruded or casted into the plugs of the invention, includes an extruder having an intermeshing Theysohn TSK-TT 020 twin screw extruder, which has a screw diameter of 20.6 mm and an L/D ratio of 36:1 (i.e., the total barrel/extrusion length is 36 D). The extruder comprises six temperature controlled zones, each of length 6 D, and a die heating zone at the extruder outlet, and is driven by a 3HP electrical motor and is capable of operating from 0 to 500 rpm. Zone temperature is controlled automatically through electrical heating and water-cooling. Various feed ports are located along the extruder barrel length for liquid injection, solid feeding, venting and vacuum degassing. The extruder is also equipped with screws of various types for different operation modes such as melting and plastication, dispersion, distribution, devolatilization and degassing, and processing of high viscosity materials such as thermoplastic molding and highly filled composite processing. Extruder throughput rate ranges from less than 5 pounds per hour to about 30 pounds per hour.

The extrusion system contains two liquid injection carts with heating capability for the injection of hot melt and low viscosity liquids. A third injection cart without heating capability is also used for injecting small feed rate of low viscosity and/or heat sensitive liquids.

The extrusion system contains a twin screw side stuffer that conveys solid materials through the side port located at 18 D. The side stuffer is designed for effective feeding a large volume of solids (especially low density solids) with reduced susceptibility of fluidization because of direct gravity feeding.

A cylindrical die with heating and cooling capabilities is directly connected to the outlet of the extruder. A custom designed cylindrical die can also be attached to the die to allow transportation of extrudate through a hose for downstream processing such as pultrusion.

A more specific formulation useful in this aspect of the invention includes:

| Type | Components Identity | Amt./ wt. % |
|---|---|---|
| Epoxies | DEN 431 (Dow Chemical) | 16.02 |
| | DEN 438 (Dow Chemical) | 16.02 |
| | ECN 1280 (Vantico) | 16.02 |
| Curatives (Part B) | Epon 826 (Shell Chemical) | 11.31 |
| | 4,4'-DDS (ARALDITE ® epoxy cresol novolac (ECN) Ciba Specialty Chemicals) | 2.6 |
| | AMICURE CG1400 (Air Products and Chemical Inc.) | 3.30 |
| | MY-24 (Curing Agent, Ajinomoto U.S.A., Inc., Teaneck, NJ) | 3.30 |
| | Epon 828/tinted green (Shell Chemical) (green tint is DuPont MONASTRAL ® Green G, Code GT-751-D) | 0.21 |
| Thixotropic agent | TS-720 | 0.77 |
| | SI 310/SI 311 hollow glass microspheres (Emerson & Cuming, Canton, MA) | 21.81 |
| In situ expandable particles | 092 DU 120 | 8.59 |

The thixotropic agent is a high surface area inorganic oxide, and is fed into the extruder as a solid powder through the main feed port at 1.5 D. Epoxies are pre-blended as a liquid at elevated temperature (~200° F.) in a batch vessel before it is transported to the holding tank of the liquid injection cart. The heated liquid can be pumped at a temperature below 250° F. into the extruder, usually through the ports a 4.5 D or 6 D. Dispersive mixing of the solid with the liquid occurs in the first three zones of the extruder up to 18 D at a temperature from 160° F. to 250° F. A large number of kneading elements is used to provide high shear stress to facilitate the mixing. The hollow glass microspheres, which are shear stress sensitive and light in density, are introduced into the extruder through the side stuffer at 18 D. Deep flighted conveying elements are used to allow more effective downstream material transport due to the large increase in extrusion material volume after the microspheres addition. Low shear gear type mixing elements are used for low shear stress distributive mixing to avoid breaking and cracking of microspheres. In situ-expandable particles which exhibit initiation of expansion at temperature above 220° F. to 230° F. and could be shear sensitive at temperature above 180° F. can be introduced into the extruder either through direct gravity feeding at 12 D or through the side stuffer. In the former case, extrusion temperature from zone 3 downstream is reduced to less than 180° F. Fluidization is not obvious at the above listed loading range. Feeding through the side stuffer together with the glass microspheres (with an independent solid feeder) is more commonly employed. The curatives are milled into a low viscosity epoxy to form a Part B intermediate. The intermediate is introduced into the extruder as a liquid through another liquid injection cart at around 110° F., usually through the port at 27 D. Injection ports at 12 D, 15 D, and 21 D can also be used, but downstream injection is recommended to minimize the residence time of the curatives at elevated temperature in the extruder. Since maximum residence time in the extruder for this operation is no longer than 5 minutes, premature material advancement is minimal at temperature below 180° F. A vacuum has been applied at the vent port at 24 D for degassing. To allow more effective degassing, upstream atmospheric venting at 12 D or 15 D is also recommended to evacuate the air introduced into the extruder through the side stuffer. The extruder usually runs at a high rpm (250 rpm to 500 rpm) to maximize the throughput rate.

Extruded material can be directly discharged to a die for making plugs as defined herein or extruded to a pultrusion device or a cast mold for making plugs as defined.

A formulation for making plugs includes:

| | |
|---|---|
| Epoxy novolac DEN 438, | 9.57 wt. % |
| Glass microspheres, | 22.1 wt. % |
| Part B from above formulation, | 17.90 wt. % |
| 1/64 inch glass fiber, | 3 wt. % |
| 92 DU 120, | 8.55 wt. % |

An extruded non-sagging plug made from this formulation achieved about 30% expansion in a small rectangular mold, by increasing heating of the mold at a rate of 5° F./minute to an oven temperature of 260° F. and hold the mold at that temperature for 2 hours. The cured plug replicated the interior of the mold.

A benzoxazine-containing heat curable composition within the scope of the invention may be prepared from the following components within the recited ranges as follows:

| Formulation | Preferred Range Percent By Weight | Preferred Percent By Weight |
|---|---|---|
| Resin | | |
| Benzoxazine, 10 to 90 wt. % Epoxy resin or episulfide resin component, 0 to 60 wt. % One or more of an oxazoline component, a cyanate ester component, a phenolic component, and a thiophenolic component, 0 to 95 wt. % One or more of an acrylonitrile-butadiene copolymer component, polyimide component, and a polyimide/siloxane component, 0 to 40 wt. % Curative, 0 to 30 wt. % | 40 to 80 | 75 |

| Formulation | Preferred Range Percent By Weight | Preferred Percent By Weight |
|---|---|---|
| Incompatible in situ isotropically expandable thermoplastic particles containing expansion agent therein | 5 to 45 | 5 |
| Fibers | 0 to 20 | 6 to 14 |
| Glass microspheres | 0 to 10 | 2 to 6 |

As noted above, these resin formulations are made by conventional mixing of the components in standard mixing equipment for viscous compositions, such as a ROSS® Double Planetary Mixer.

A more specific formulation for the benzoxazine-containing heat curable composition includes:
Component

| Type | Identity | Amt/wt. % |
|---|---|---|
| Benzoxazine | Polyfunctional Benzoxazine (Vantico) | 46.93 |
| Epoxy | CY179 (Vantico) | 15.64 |
| Toughener | ATBN HYCAR 1300X16 (Noveon) | 6.26 |
| Thixotropic agent | TS-720 | 0.77 |
| Preexpanded microspheres | SI 310/SI 311 hollow glass microspheres | 21.81 |
| In situ expandable particles | 092 DU 120 | 8.59 |

A benzoxazine-containing heat curable formulation for making plugs includes:

| | |
|---|---|
| Polybenzoxazine, | 56.5 wt. % |
| Phenoxy resin PKHC, | 9.6 wt. % |
| Glass microspheres, | 22.3 wt. % |
| 1/64 inch glass fiber, | 3.0 wt. % |
| 92 DU 120, | 8.6 wt. % |

What is claimed is:

1. A pre-shaped sag-resistant nucleus-forming monolithic composite comprising:
    (a) thermoplastic particles;
    (b) a heat curable composition comprising a benzoxazine component; and
    (c) a material for rendering the monolithic composite sag resistant,
wherein the thermoplastic particles are substantially uniformly distributed in the heat curable composition.

2. The monolithic composite of claim 1, wherein the heat curable composition further comprises acrylonitrile-butadiene co-polymer having secondary amine terminal groups.

3. The monolithic composite of claim 1, wherein the heat curable composition further comprises an epoxy or episulfide component; optionally, one or more of an oxazoline component, a cyanate ester component, a phenolic component, and a thiophenolic component; optionally, a toughener component; and optionally, a curative.

4. The monolithic composite of claim 1, having a substantially uniform density and thickness across its breadth and an external shape and size that is dimensionally similar to a hollow interior component of a structural material for which it is designed to be introduced for subsequent thermal expansion.

5. A sag-resistant nucleus-forming monolithic composite of thermoplastic particles, substantially uniformly distributed in a heat curable composition, having a substantially uniform density and thickness across its breadth, and an external shape and size that is dimensionally similar to a hollow interior component of a structural material that is about 1.01 to about 4 times greater in volume than the volume of monolithic composite, and wherein the heat curable composition comprises (a) a benzoxazine component.

6. The monolithic composite of claim 5, wherein the heat curable composition further comprises (b) acrylonitrile-butadiene co-polymer having secondary amine terminal groups.

7. The monolithic composite of claim 5, wherein the heat curable composition further comprises:
    (b) an epoxy or episulfide component;
    (c) optionally, one or more of an oxazoline component, a cyanate ester component, a phenolic component, and a thiophenolic component;
    (d) optionally, a toughener component; and
    (e) optionally, a curative.

8. The monolithic composite of claim 5, having a shape and dimension that substantially correlate to the shape and is at least close to proportional to the dimensions of the hollow interior component of a structural material into which it can be readily inserted and isotropically expanded to form a syntactic foam with closed microcells.

9. The monolithic composite of claim 5, wherein the conformance of the shape and dimension of the sag-resistant nucleus-forming monolithic composite to the hollow interior component of a structural material is proportional in dimension of the sag-resistant nucleus-forming monolithic composite to the hollow interior component such that the composite isotropically expands about 1.01 to about 4 times in volume to fully fill the previously hollow interior component.

10. The monolithic composite of claim 1, in the shape of a plug.

11. The monolithic composite of claim 1, wherein the benzoxazine of the heat curable composition comprises:

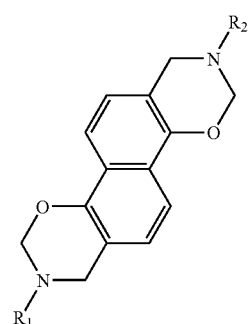

wherein o is 1-4, X is selected from the group consisting of a direct bond (when o is 2), alkyl (when o is 1), alkylene (when 1 is 2-4), carbonyl (when o is 2), thiol (when o is 1), thioether (when o is 2), sulfoxide (when o is 2), and sulfone (when o is 2), $R_1$ is selected from the group consisting of hydrogen, alkyl and aryl, and $R_4$ is selected from hydrogen, halogen and alkyl.

12. The monolithic composite of claim 1, wherein the benzoxazine of the heat curable composition comprises one or more of:

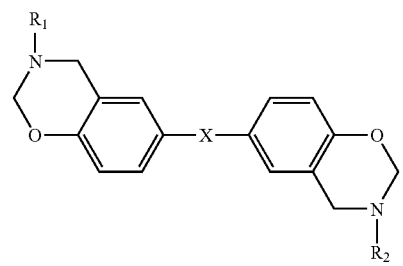

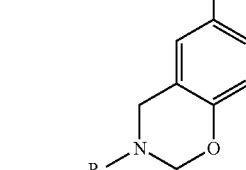

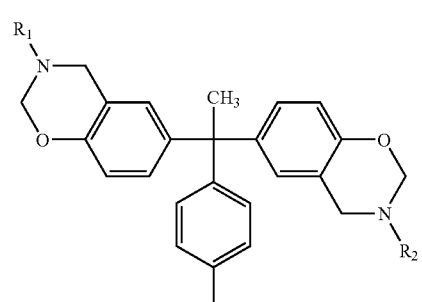

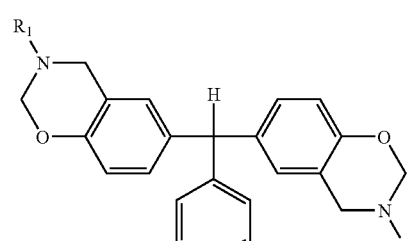

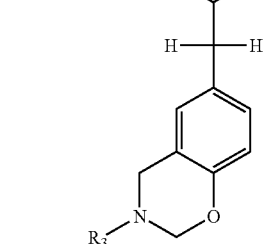

wherein X is selected from the group consisting of a direct bond, $CH_2$, $C(CH_3)_2$, C=O, S, S=O and O=S=O, and $R_1$, $R_2$ and $R_3$ are the same or different and are selected from the group consisting of hydrogen, alkyl and aryl.

13. The monolithic composite of claim 1, wherein the benzoxazine of the heat curable composition comprises:

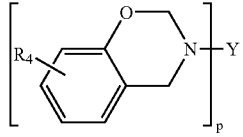

wherein p is 2, Y is selected from the group consisting of biphenyl (when p is 2), diphenyl methane (when p is 2), diphenyl isopropane (when p is 2), diphenyl sulfide (when p is 2), diphenyl sulfoxide (when p is 2), diphenyl sulfone (when p is 2), and diphenyl ketone (when p is 2), and $R_4$ is selected from hydrogen, halogen and alkyl.

14. The monolithic composite of claim 1, wherein the benzoxazine of the heat curable composition comprises one or more of:

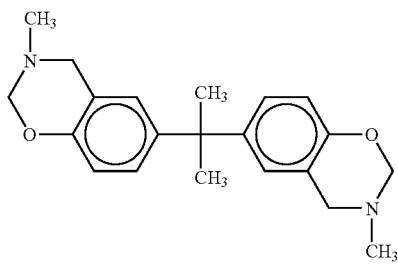

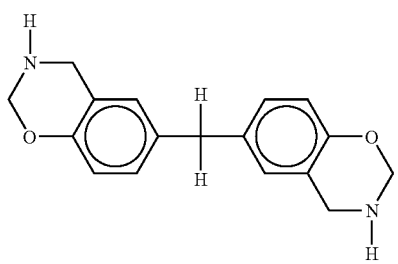

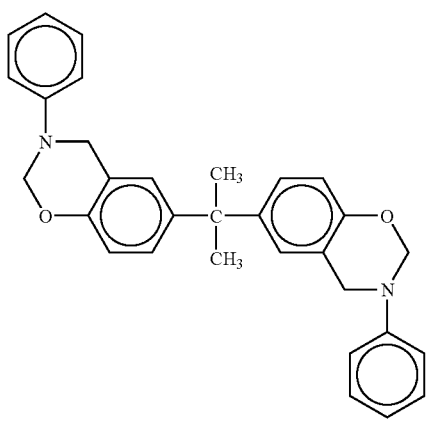

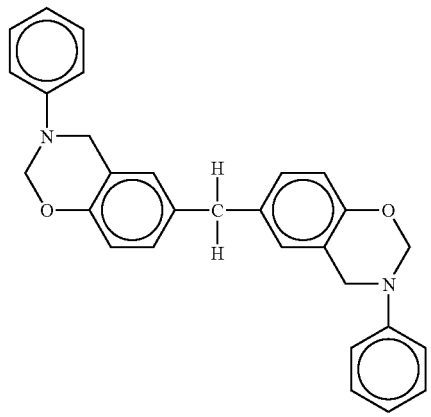

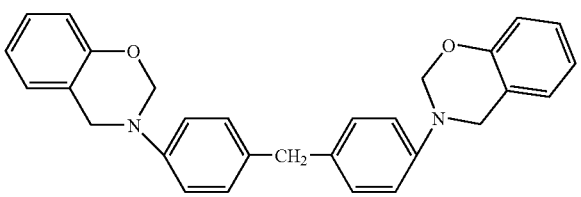

15. The sag-resistant nucleus-forming monolithic composite of claim 5, wherein the benzoxazine of the heat curable composition comprises:

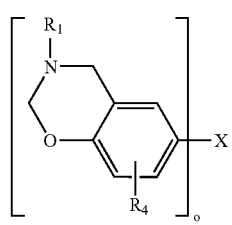

wherein o is 1-4, X is selected from the group consisting of a direct bond (when o is 2), alkyl (when o is 1), alkylene (when o is 2-4), carbonyl (when o is 2), thiol (when o is 1), thioether (when o is 2), sulfoxide (when o is 2), and sulfone (when o is 2), $R_1$ is selected from the group consisting of hydrogen, alkyl and aryl, and $R_4$ is selected from hydrogen, halogen and alkyl.

16. The sag-resistant nucleus-forming monolithic composite of claim 5, wherein the benzoxazine of the heat curable composition comprises one or more of:

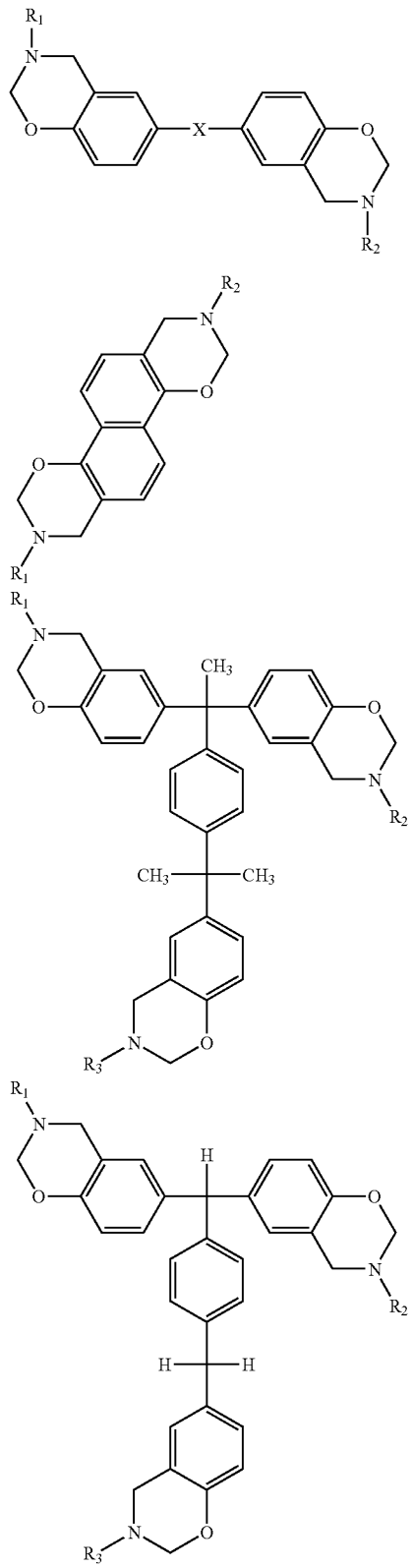

wherein X is selected from the group consisting of a direct bond, $CH_2$, $C(CH_3)_2$, C=O, S, S=O and O=S=O, and $R_1$, $R_2$ and $R_3$ are the same or different and are selected from the group consisting of hydrogen, alkyl and aryl.

17. The sag-resistant nucleus-forming monolithic composite of claim 5, wherein the benzoxazine of the heat curable composition comprises

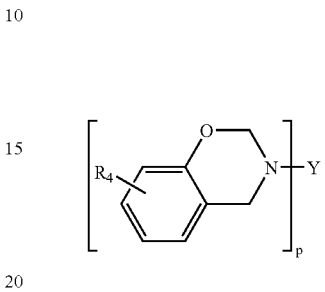

wherein p is 2, Y is selected from the group consisting of biphenyl (when p is 2), diphenyl methane (when p is 2), diphenyl isopropane (when p is 2), diphenyl sulfide (when p is 2), diphenyl sulfoxide (when p is 2), diphenyl sulfone (when p is 2), and diphenyl ketone (when p is 2), and $R_4$ is selected from hydrogen, halogen and alkyl.

18. The sag-resistant nucleus-forming monolithic composite of claim 5, wherein the benzoxazine of the heat curable composition comprises one or more of

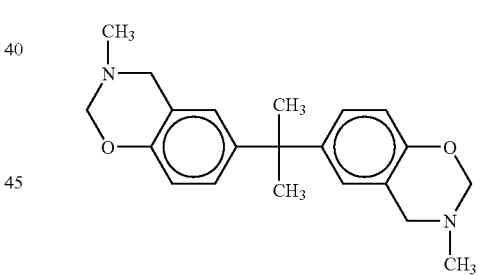

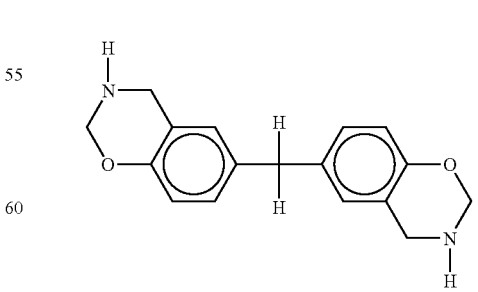

-continued

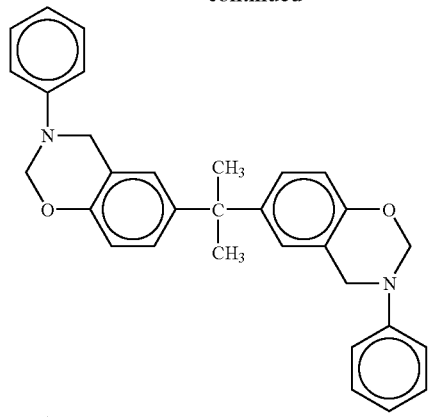

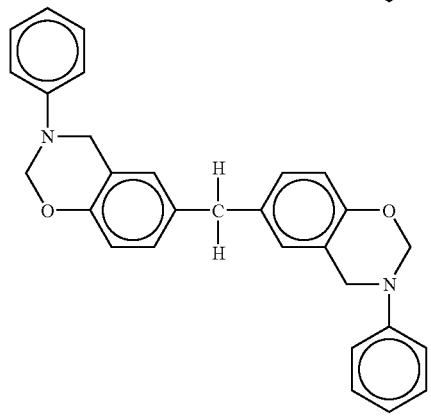

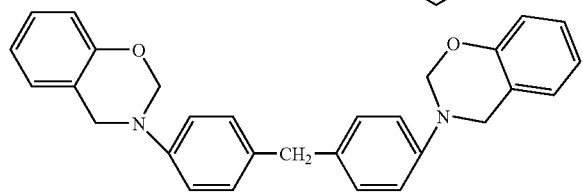

-continued

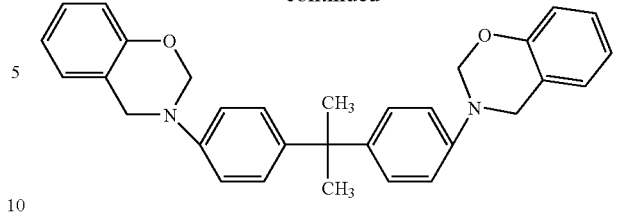

19. The monolithic composite of claim 1, wherein the thermoplastic particles are pre-expanded.

20. The monolithic composite of claim 1, wherein the thermoplastic particles are in situ expandable.

21. The sag-resistant nucleus-forming monolithic composite of claim 5, wherein the thermoplastic particles are pre-expanded.

22. The sag-resistant nucleus-forming monolithic composite of claim 5, wherein the thermoplastic particles are in situ expandable.

23. The monolithic composite of claim 1, wherein the monolithic composite is adapted for use within a hollow interior portion of a structural material without opposing surfaces of the monolithic composite facing each other, thereby establishing an essentially faultless interface with the structural material.

24. The monolithic composite of claim 1, wherein the material for rendering the monolithic composite sag resistant comprises a thixotropic agent.

25. The monolithic composite of claim 1, wherein the monolithic composite is capable of being located within a hollow interior portion of a structural material and being isotropically expanded therein.

* * * * *